(12) United States Patent
Strickroth

(10) Patent No.: US 11,369,922 B2
(45) Date of Patent: *Jun. 28, 2022

(54) CATALYST MIXTURE FOR THE TREATMENT OF WASTE GAS

(71) Applicant: CPPE CARBON PROCESS & PLANT ENGINEERING S.A., Rodange (LU)

(72) Inventor: Alain Strickroth, Belvaux (LU)

(73) Assignee: CPPE CARBON PROCESS & PLANT ENGINEERING S.A., Rodange (LU)

(*) Notice: Subject to any disclaimer, the term of this patent is extended or adjusted under 35 U.S.C. 154(b) by 322 days.

This patent is subject to a terminal disclaimer.

(21) Appl. No.: 16/091,096

(22) PCT Filed: Apr. 4, 2017

(86) PCT No.: PCT/EP2017/058008
§ 371 (c)(1),
(2) Date: Oct. 3, 2018

(87) PCT Pub. No.: WO2017/177459
PCT Pub. Date: Oct. 12, 2017

(65) Prior Publication Data
US 2019/0118139 A1    Apr. 25, 2019

(30) Foreign Application Priority Data

Apr. 4, 2016 (LU) .......................... 93 014

(51) Int. Cl.
*B01D 53/00* (2006.01)
*B01D 53/88* (2006.01)
(Continued)

(52) U.S. Cl.
CPC ....... *B01D 53/885* (2013.01); *B01D 53/1481* (2013.01); *B01D 53/64* (2013.01);
(Continued)

(58) Field of Classification Search
None
See application file for complete search history.

(56) References Cited

U.S. PATENT DOCUMENTS 2,409,494 A * 10/1946 Keating ................... B01J 21/12
502/235
3,925,248 A * 12/1975 Moroni ................. B01J 31/068
502/159
(Continued)

FOREIGN PATENT DOCUMENTS

CN         1032772 A    5/1989
CN       101573291 A   11/2009
(Continued)

OTHER PUBLICATIONS

CN-103193301-A—English translation (Year: 2013).*
(Continued)

*Primary Examiner* — Stefanie J Cohen
(74) *Attorney, Agent, or Firm* — Cantor Colburn LLP

(57) ABSTRACT

A catalyst comprises a mixture of 95% vol. to 30% vol. of an activated carbon catalyst and from 5% vol. to 70% vol. of a filler material as well as a configuration of such a catalyst for the removal of $SO_2$, heavy metals and/or dioxins form waste gas and liquids.

17 Claims, 14 Drawing Sheets

Effect of activated carbon type mixed with filler material/activated carbon ratio 1/4

(51) Int. Cl.

| | | |
|---|---|---|
| *B01J 37/20* | (2006.01) | |
| *B01J 21/18* | (2006.01) | |
| *B01J 23/745* | (2006.01) | |
| *B01J 35/02* | (2006.01) | |
| *B01J 37/02* | (2006.01) | |
| *B01J 35/00* | (2006.01) | |
| *B01D 53/86* | (2006.01) | |
| *B01D 53/14* | (2006.01) | |
| *B01D 53/64* | (2006.01) | |
| B01D 53/96 | (2006.01) | |
| B01J 8/02 | (2006.01) | |

(52) U.S. Cl.
CPC ......... *B01D 53/86* (2013.01); *B01D 53/8609* (2013.01); *B01D 53/8665* (2013.01); *B01D 53/8668* (2013.01); *B01D 53/88* (2013.01); *B01J 21/18* (2013.01); *B01J 23/745* (2013.01); *B01J 35/0006* (2013.01); *B01J 35/026* (2013.01); *B01J 37/0201* (2013.01); *B01J 37/0207* (2013.01); *B01J 37/20* (2013.01); *B01D 53/96* (2013.01); *B01D 2255/702* (2013.01); *B01D 2257/302* (2013.01); *B01D 2257/602* (2013.01); *B01D 2257/70* (2013.01); *B01D 2258/025* (2013.01); *B01D 2258/0233* (2013.01); *B01D 2258/0291* (2013.01); *B01J 8/02* (2013.01); *B01J 2523/842* (2013.01)

(56) References Cited

U.S. PATENT DOCUMENTS

| | | | |
|---|---|---|---|
| 4,710,364 A | 12/1987 | Berry | |
| 4,735,785 A | 4/1988 | Eichholtz et al. | |
| 4,911,825 A | 3/1990 | Roussel et al. | |
| 5,081,085 A * | 1/1992 | Wason | C09D 7/42 |
| | | | 502/63 |
| 5,122,358 A | 6/1992 | Lailach et al. | |
| 5,914,294 A | 6/1999 | Park et al. | |
| 5,965,095 A | 10/1999 | Owens et al. | |
| 6,136,749 A * | 10/2000 | Gadkaree | B01D 53/8665 |
| | | | 502/180 |
| 6,149,886 A | 11/2000 | Schoubye | |
| 6,514,908 B1 * | 2/2003 | Kakimoto | B01J 8/008 |
| | | | 423/659 |
| 7,387,981 B1 | 6/2008 | Kaminsky et al. | |
| 7,722,843 B1 | 5/2010 | Srinivasachar | |
| 8,628,603 B2 | 1/2014 | Martin et al. | |
| 9,266,059 B2 * | 2/2016 | Vera-Castaneda | |
| | | | B01D 53/1456 |
| 10,016,723 B2 | 7/2018 | Strickroth | |
| 2001/0038814 A1 | 11/2001 | Fischer et al. | |
| 2003/0157010 A1 | 8/2003 | Anastasijevic | |
| 2006/0229476 A1 * | 10/2006 | Mitchell, Sr. | C07B 43/04 |
| | | | 568/959 |
| 2007/0007201 A1 | 1/2007 | Lupton | |
| 2007/0261557 A1 * | 11/2007 | Gadkaree | B01D 53/02 |
| | | | 96/121 |
| 2008/0207443 A1 | 8/2008 | Gadkaree et al. | |
| 2009/0111690 A1 | 4/2009 | Gadkaree et al. | |
| 2010/0000408 A1 | 1/2010 | Haruma et al. | |
| 2010/0239479 A1 | 9/2010 | Gadkaree et al. | |
| 2010/0294130 A1 | 11/2010 | Haruna et al. | |
| 2011/0223082 A1 | 9/2011 | Chang et al. | |
| 2013/0108533 A1 | 5/2013 | Strickroth | |
| 2013/0108858 A1 | 5/2013 | Biteau et al. | |
| 2013/0202504 A1 | 8/2013 | Pollack | |
| 2013/0206408 A1 | 8/2013 | Chatterjee et al. | |
| 2013/0269521 A1 | 10/2013 | Nishita et al. | |
| 2014/0314647 A1 | 10/2014 | Strickroth | |
| 2016/0243523 A1 * | 8/2016 | Saini | C02F 1/288 |
| 2016/0353743 A1 | 12/2016 | Mills | |
| 2017/0087502 A1 | 3/2017 | Jameson et al. | |
| 2019/0126200 A1 | 5/2019 | Strickroth | |

FOREIGN PATENT DOCUMENTS

| | | | | |
|---|---|---|---|---|
| CN | 103193301 A | * | 7/2013 | |
| EP | 0080491 A1 | * | 6/1983 | ............. B01D 53/34 |
| EP | 0302224 A2 | | 2/1989 | |
| EP | 1459799 A1 | | 9/2004 | |
| EP | 1726565 A1 | | 11/2006 | |
| EP | 2260940 A1 | | 12/2010 | |
| JP | H11236207 A | | 8/1999 | |
| JP | 2000296310 A | | 10/2000 | |
| JP | 2002282624 A | | 10/2002 | |
| JP | 2004081969 A | | 3/2004 | |
| JP | 3562551 B2 | | 9/2004 | |
| JP | 2006035042 A | | 2/2006 | |
| WO | 2008143831 A2 | | 11/2008 | |
| WO | WO-2015044964 A1 | * | 4/2015 | ............. B01J 20/06 |
| WO | 2015078953 A1 | | 6/2015 | |
| WO | 2016042005 A1 | | 3/2016 | |

OTHER PUBLICATIONS

EP0080491—English translation (Year: 1983).*
CN Office Action dated Feb. 28, 2019 re: Application No. 201780027960.9, pp. 1-12, citing: WO2016/042005A1, CN101573291A, CN1032772A, U.S. Pat. No. 6,149,886 A and US2003/157010A1.
JP Office Acton dated Feb. 12, 2019 re: Application No. P2018-563463, pp. 1-7, citing: JP P2006-35042A, JP P2004-81969A, JP P2002-282624A, JP P2000-296310A and WO2015/078953A1.
H. J. Fell et al. "Removal of Dioxins and Furans From Flue Gases By Non-Flammable Adsorbents in a Fixed Bed", Chemosphere, 1998, vol. 37, Nos. 9-12, pp. 2327-2334, XP002769699.
International Search Report dated May 12, 2017 re: Application No. PCT/EP2017/056902, pp. 1-4, citing: Fell et al. "Removal of Dioxins . . . ", U.S. Pat. No. 7,722,843 B1, US 2008/207443 A1, US 2010/239479 A1, US 2009/111690 A1 and U.S. Pat. No. 4,911,825 A.
Written Opinion dated May 12, 2017 re: Application No. PCT/EP2017/056902, pp. 1-5, citing: Fell et al. "Removal of Dioxins..." and US 7 722 843 B1.
International Preliminary Report on Patentability dated Jul. 19, 2018 re: Application No. PCT/EP2017/058008, pp. 1-15, citing: US 2001/038814 A1, US 2006/229476 A1, US 2014/314647 A1, US 2010/000408 A1, US 2010/294130 M, EP 1 459 799 A1, US 2013/269521 A1, EP 1 726 565 A1, US 2013/108533, A1 2007/007201 A1, WO 2016/042005 A1 and U.S. Pat. No. 7,387,981 B1.
International Search Report dated Jun. 21, 2017 re: Application No. PCT/EP2017/058008, pp. 1-5, citing: US 2001/038814 A1, US 2006/229476 A1, US 2014/314647 A1, US 2010/000408 A1, US 2010/294130 A1, EP 1 459 799 M, US 2013/269521 A1, EP 1 726 565 A1, US 2013/108533, A1 2007/007201 A1, WO 2016/042005 A1 and U.S. Pat. No. 7,387,981 B1.
Written Opinion dated Jun. 21, 2017 re: Application No. PCT/EP2017/058008, pp. 1-5, citing: US 2001/038814 A1, US 2006/229476 A1, US 2014/314647 A1, US 2010/000408 A1, US 2010/294130 A1, EP 1 459 799 A1, US 2013/269521 A1, EP 1 726 565 A1, US 2013/108533, A1 2007/007201 A1 and WO 2016/042005 A1.
International Preliminary Report on Patentability re: Application No. PCT/EP2017/057789, dated Apr. 3, 2018, pp. 1-36.
International Search Report dated Jun. 12, 2017 re: Application No. PCT/EP2017/057789, pp. 1-4, citing: EP 0 02 224 A2, EP 2 260 940 A1, JP H11 236207 A, JP 3 562551 B2.
Written Opinion dated Jun. 12, 2017 re: Application No. PCT/EP2017/057789, pp. 1-6, citing: EP 0 02 224 A2, EP 2 260 940 A1, JP H11 236207 A, JP 3 562551 B2.
Cheng Yuwei, "Study on removal of SO2 from Claus tall gas by adsorption and elution method", Cheng Yuwei, China Master's Theses, Full-text Database Engineering, Technology Series 1, 2012, No. 10, B027-1035, 9 pages, Machine Translation only.

(56) References Cited

OTHER PUBLICATIONS

Nana et al., "Progress in modification of activated carbon as adsorbent used in flue gas desulfurization", Petrochemical Technology, vol. 41, No. 9, 4 pages, Machine Translation only.
Ying et al., "Application of Lightweight Carbon Materials", National Defense Industry Press, 2 pages, Nov. 30, 2013, Machine Translation only.
Yonghui et al., "Theories and methods of the treatment of effluent from cyanide-abstracting gold", Metallurgical Industry Press, 4 pages, Mar. 31, 2015, Machine Translation only.

* cited by examiner

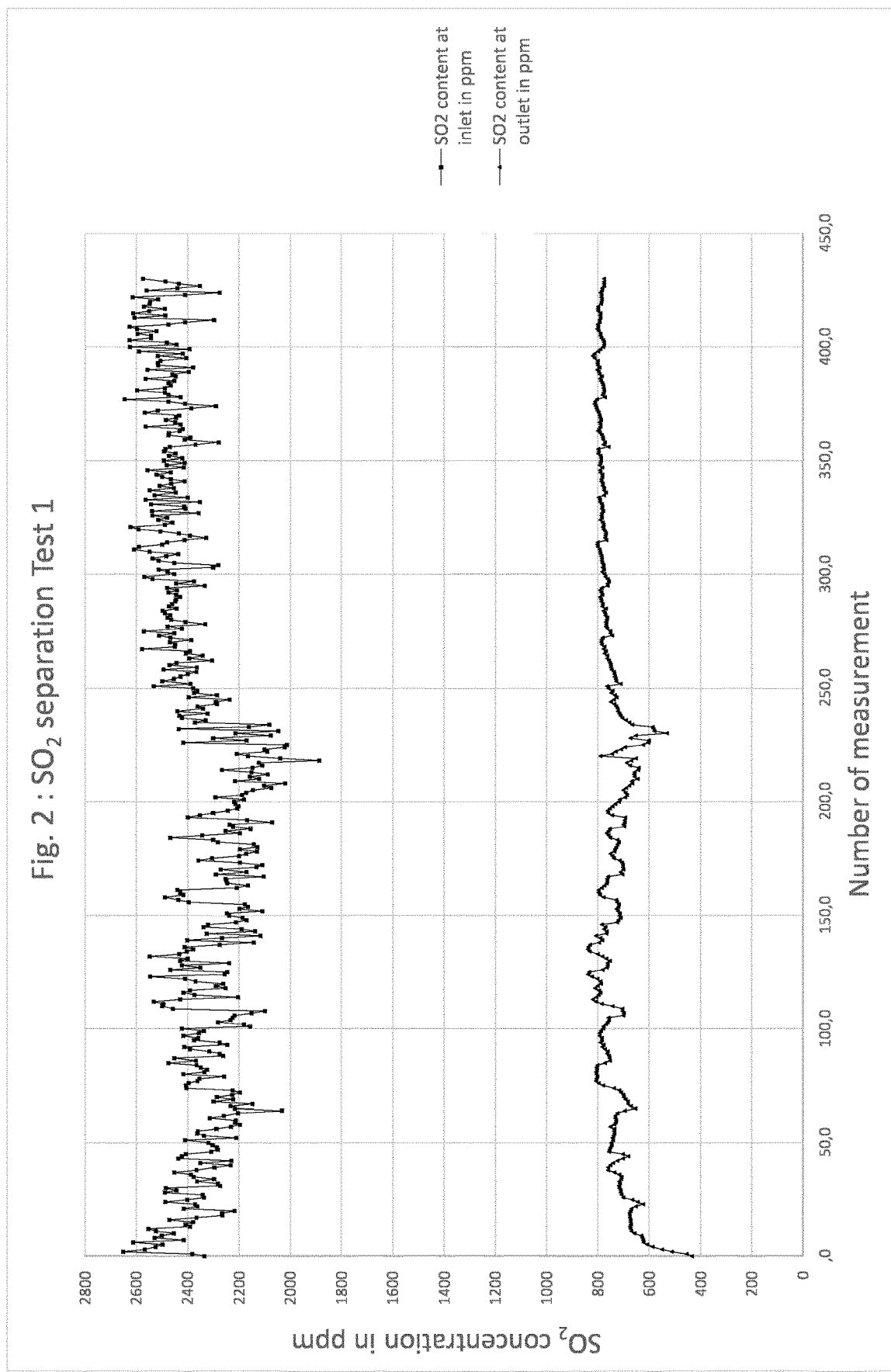

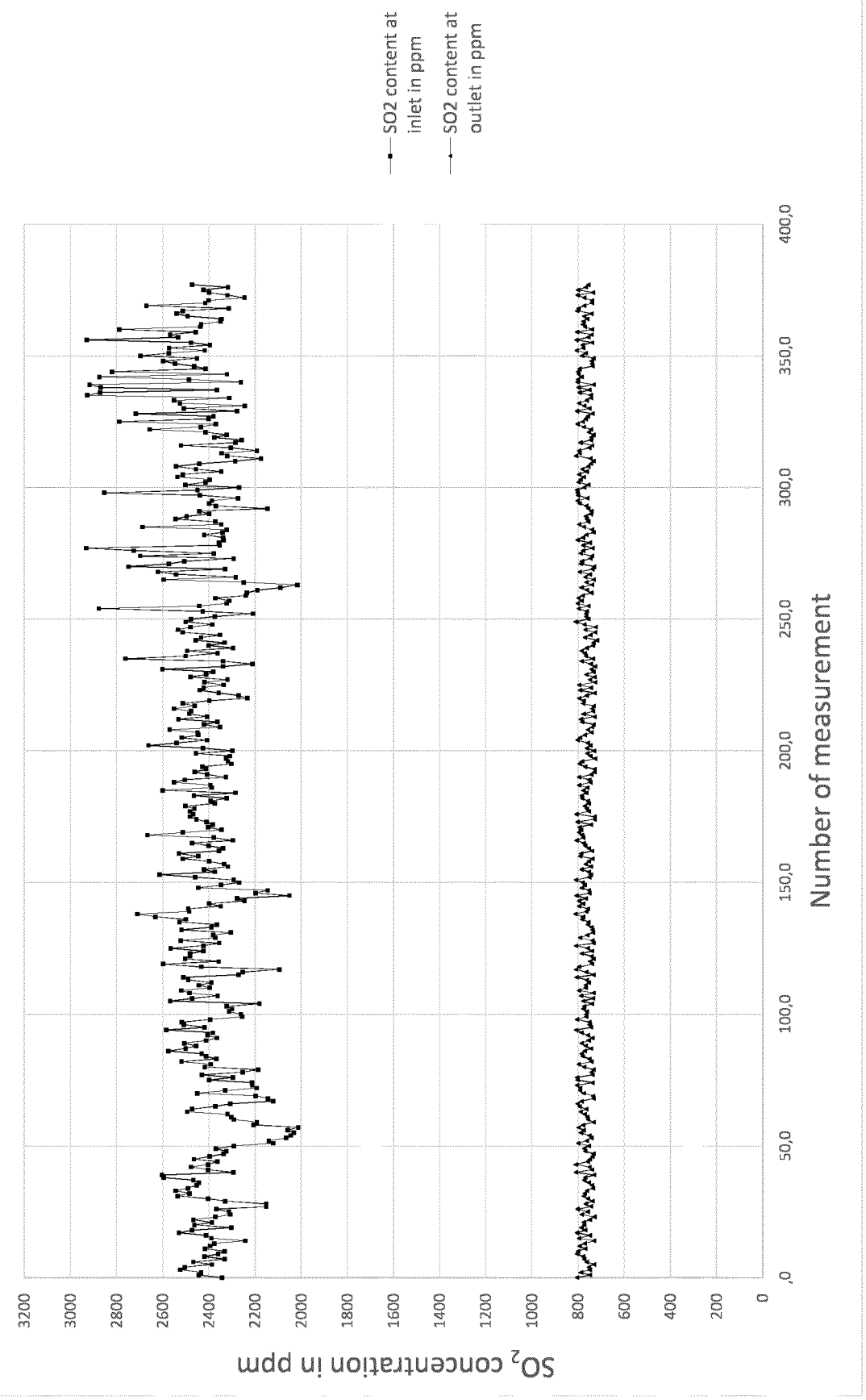

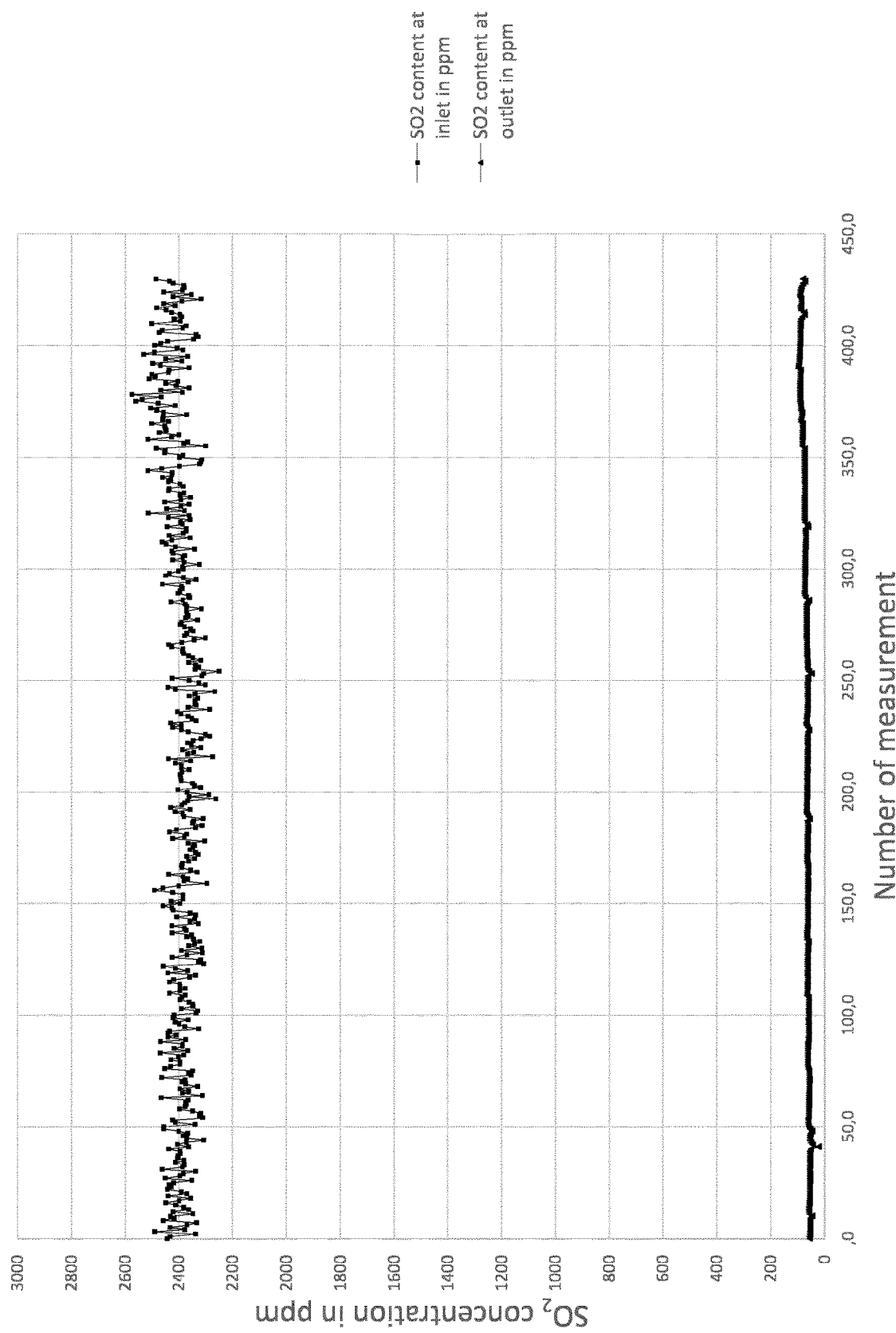

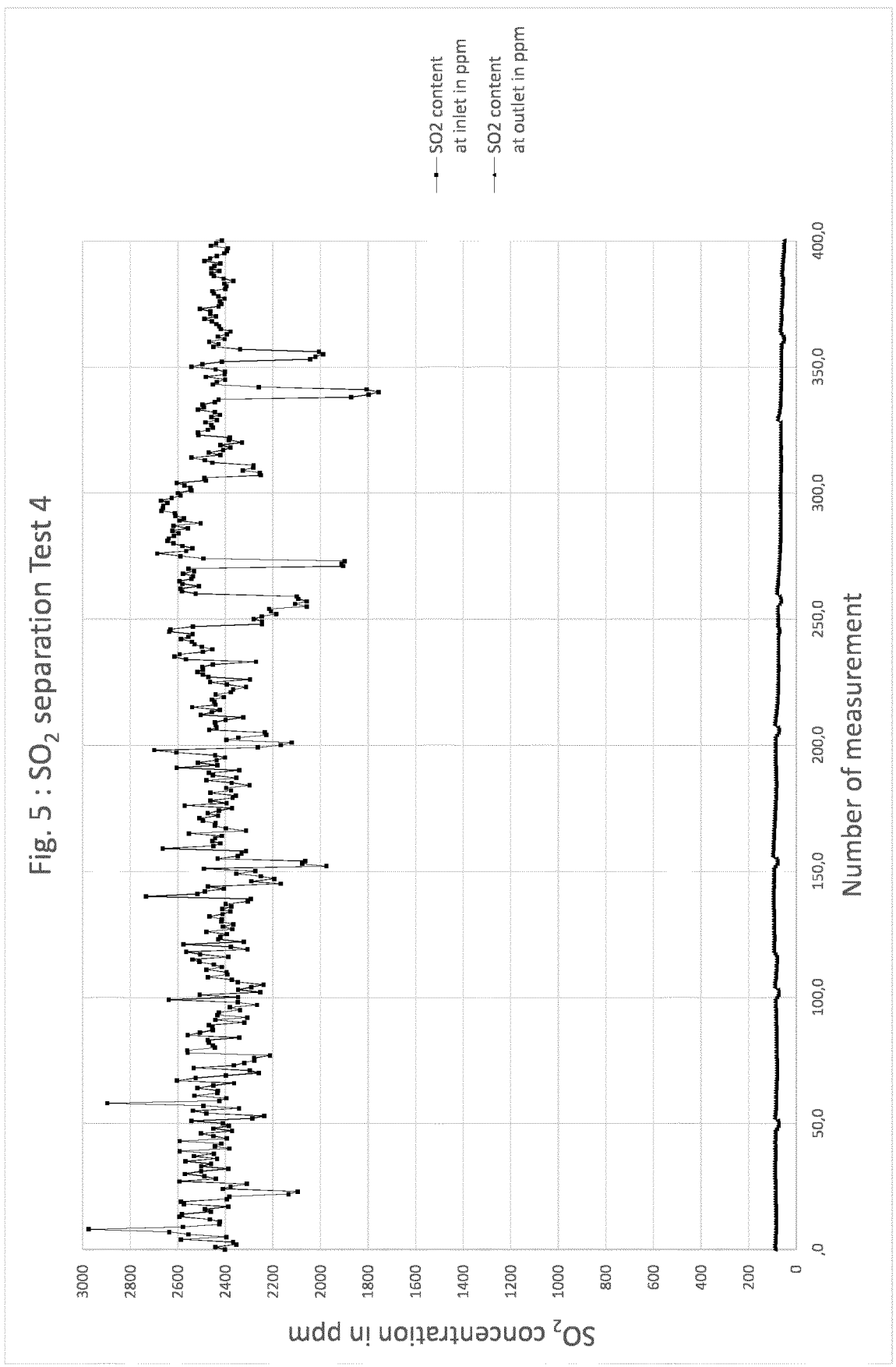

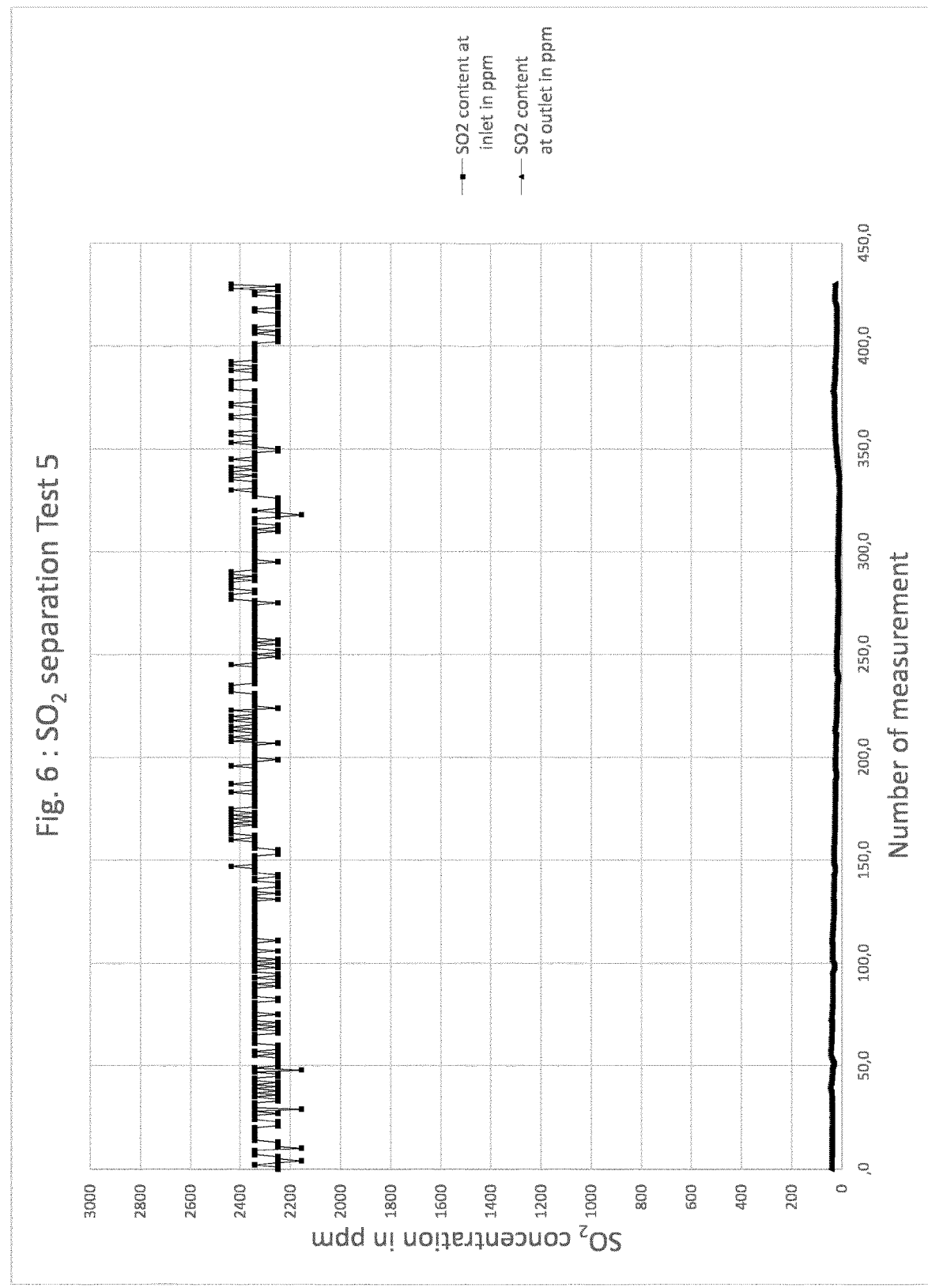

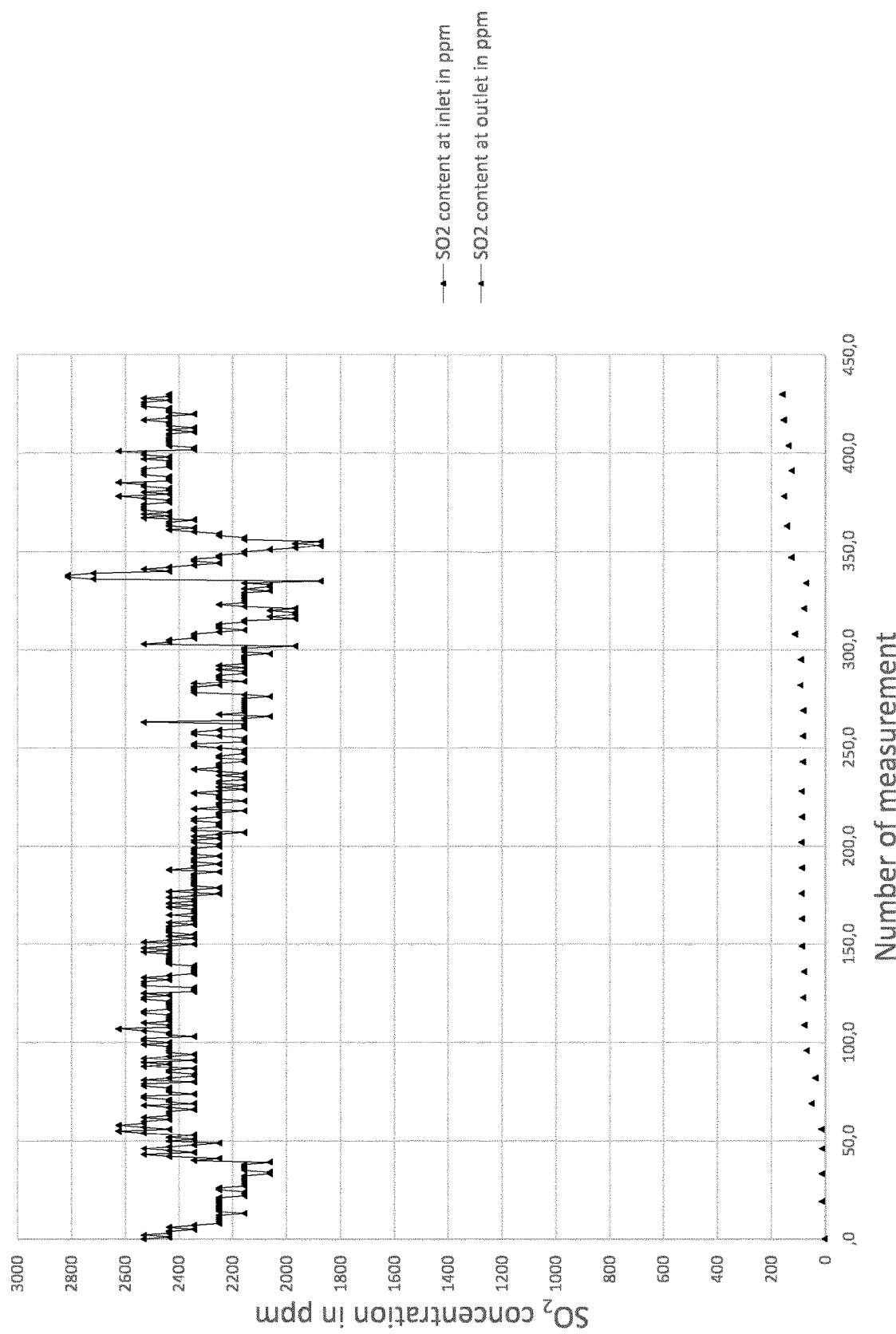

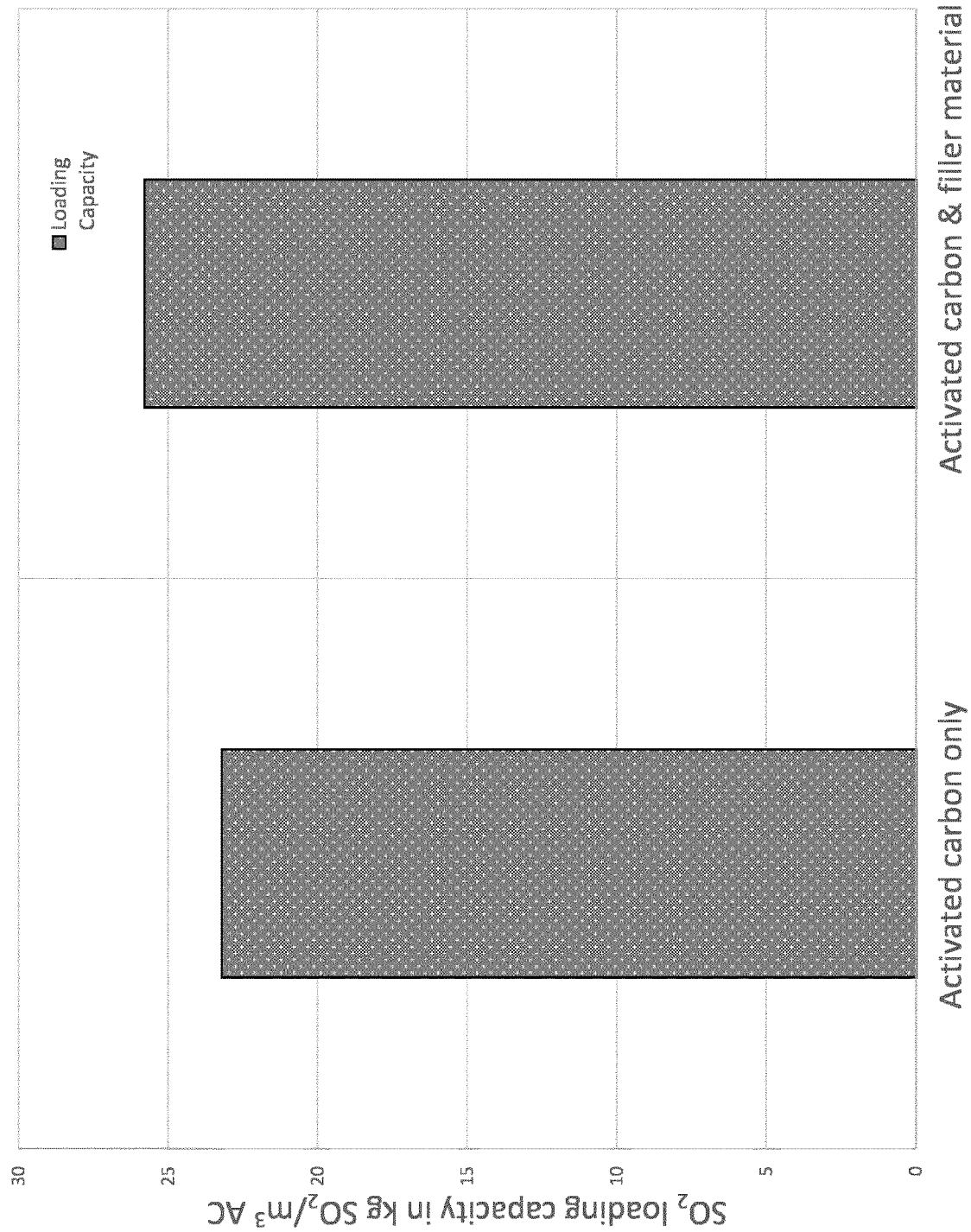

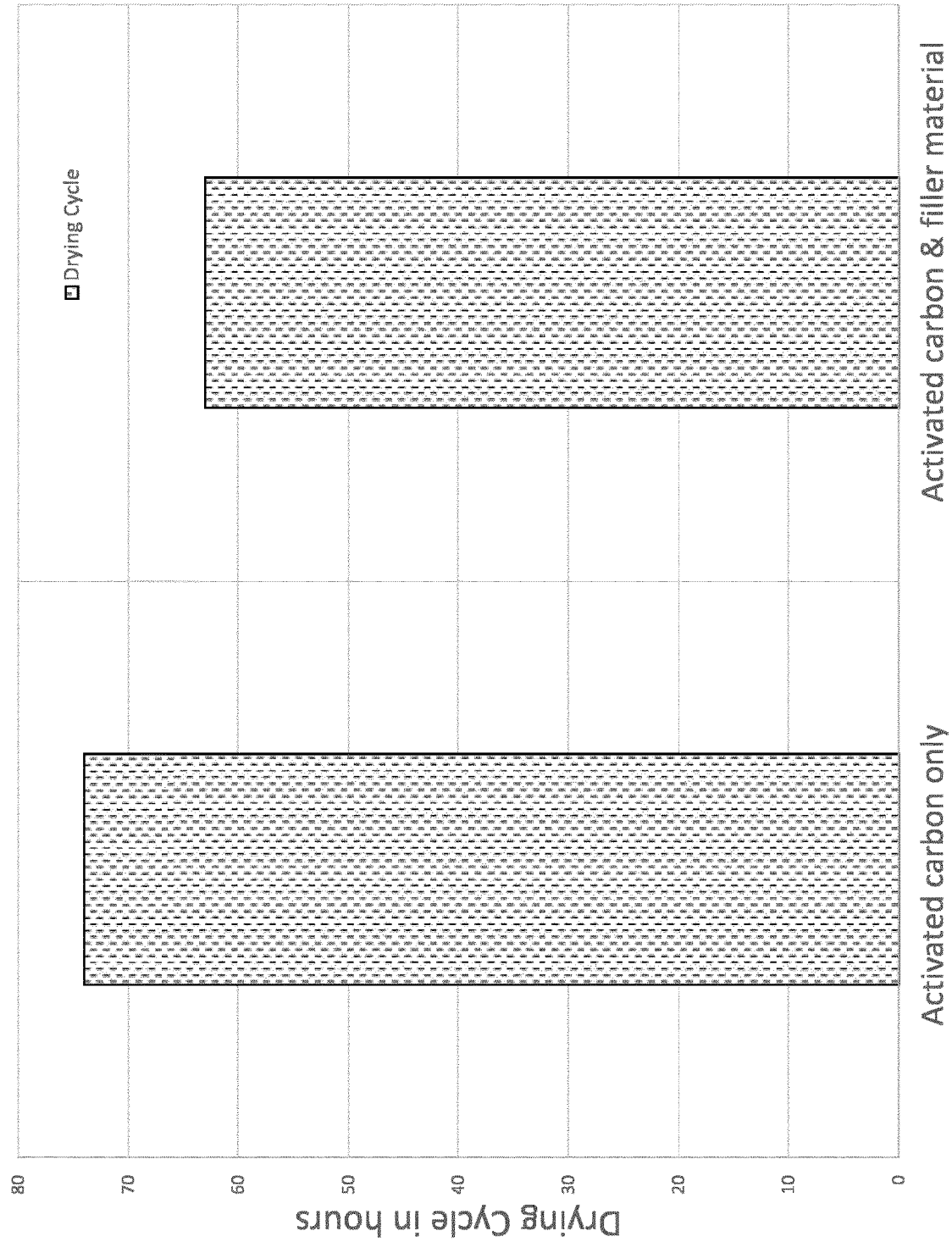

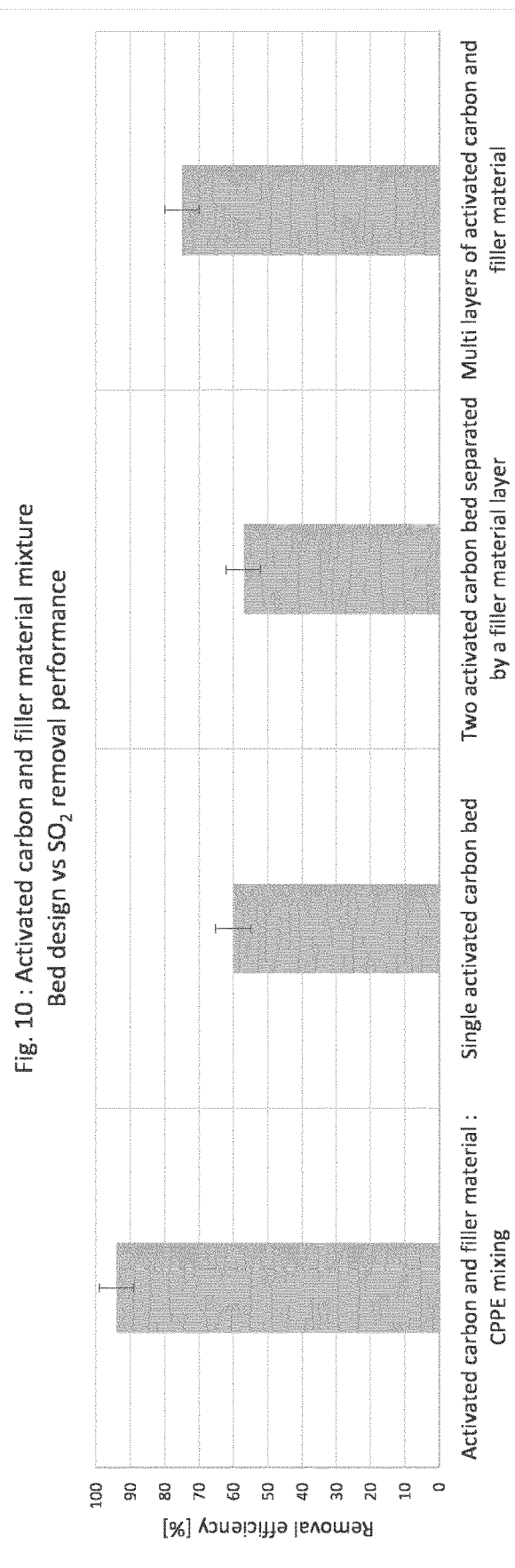

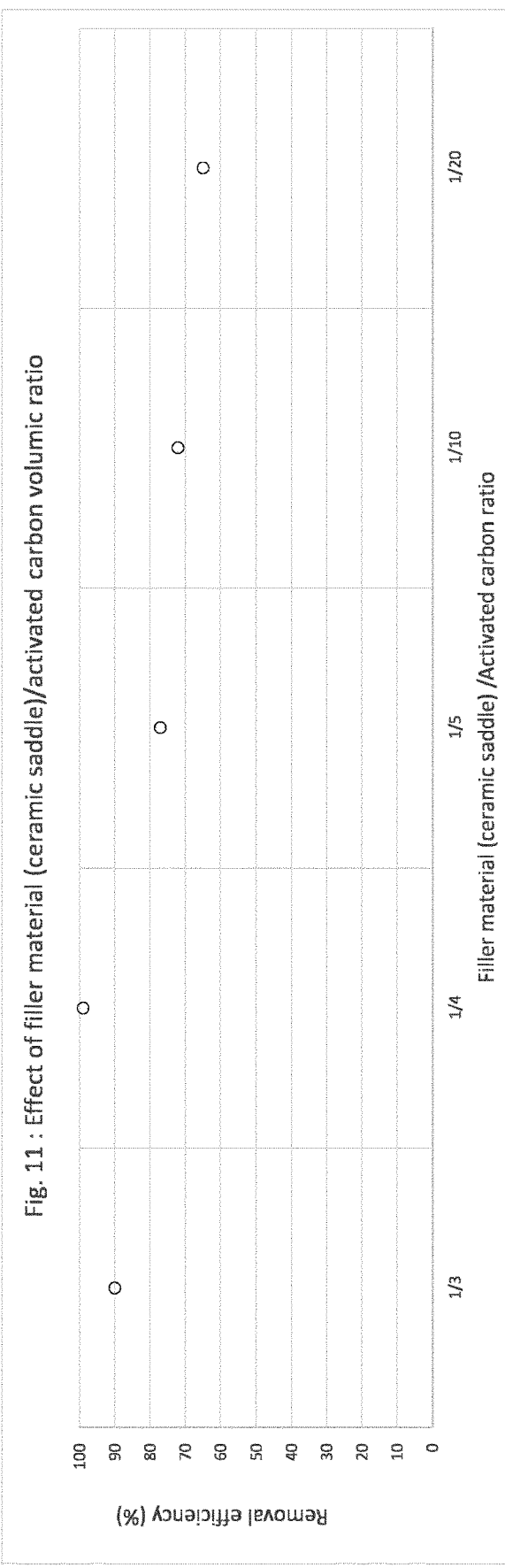

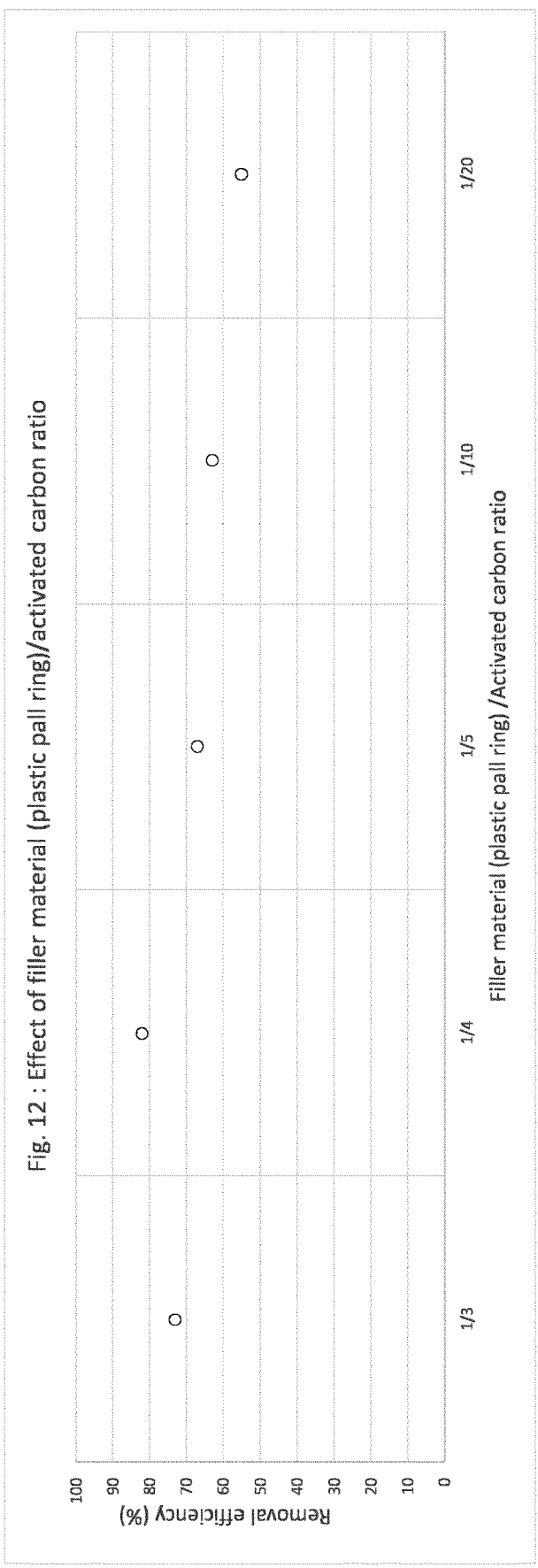

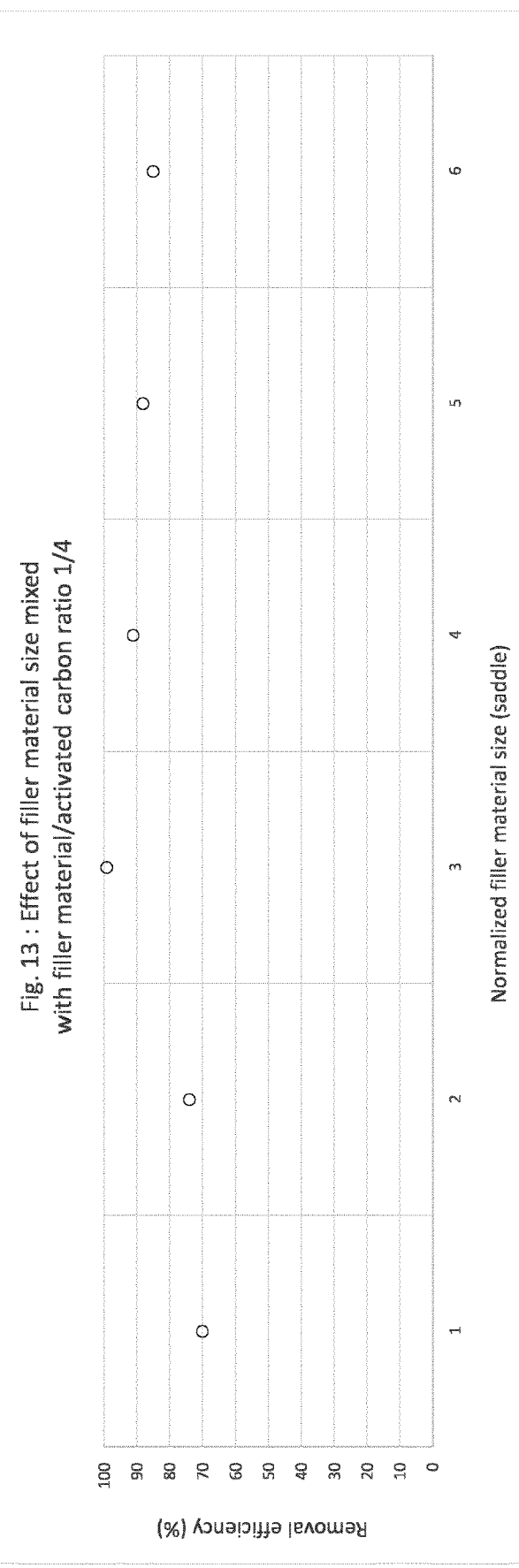

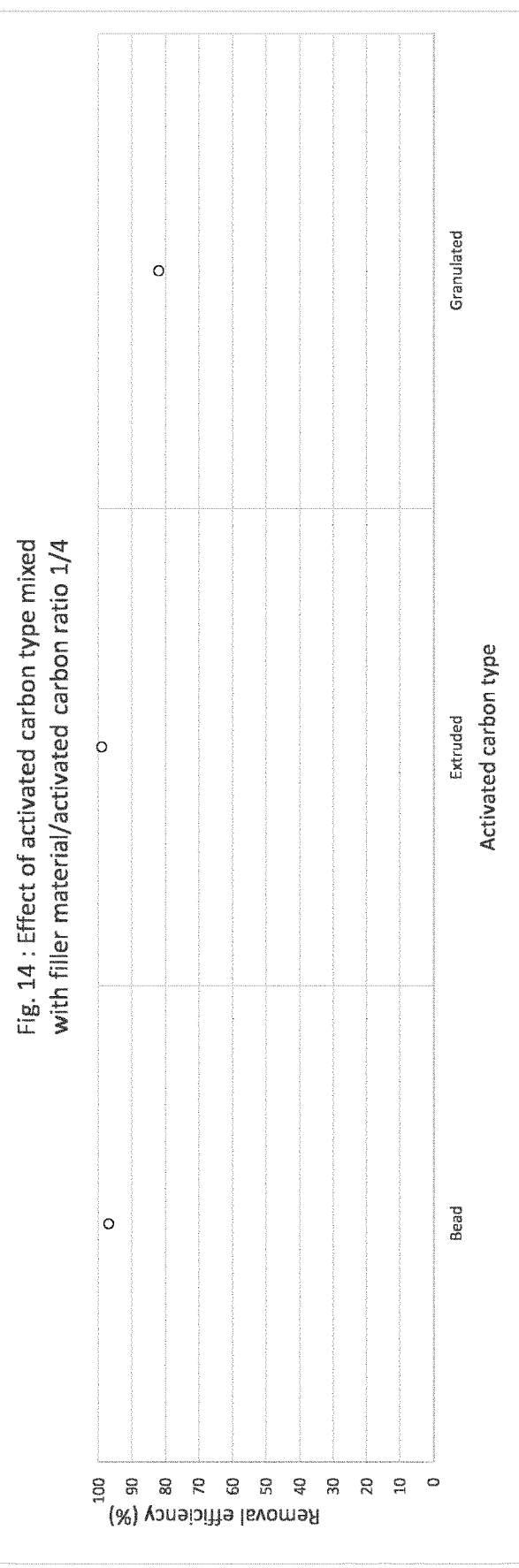

CATALYST MIXTURE FOR THE TREATMENT OF WASTE GAS

TECHNICAL FIELD

The present disclosure generally relates to a catalyst mixture for the treatment of waste gas generated by chemical and metallurgical processes.

BACKGROUND ART

It is known to treat waste gas/flue gas with activated carbon catalysts.

A first application of such catalysts is the sulfur dioxide removal from waste gas known as Sulfacid® process. This process has been especially developed to meet the dual objectives of $SO_2$ removal from waste gases generated by chemical and metallurgical processes and transformation into industrial grade sulfuric acid. It lends itself particularly well to applications where sulfuric acid can be directly used, for example titanium dioxide production or similar sulfuric acid based processes. Additionally, the fixed activated carbon catalyst bed is able to remove heavy metals (such as Hg and Cd) from the waste gas.

Typical waste gas inlet parameters:

| | |
|---|---|
| $SO_2$ content | up to 1 vol. % |
| Hg content | 150 µg/Nm³ dry |
| $O_2$ content | min. 7 vol. % |
| Temperature | 50-80° C. |
| Dust content | <30 mg/m³ STP (all data refers to dry gas) |

Typical clean gas outlet parameters:

| | |
|---|---|
| $SO_2$ content | ≤50 mg/Nm³ dry |
| Hg content | 25 µg/Nm³ dry |

The raw gas flows through an activated carbon catalyst fixed bed inside a reactor. The $SO_2$ is converted to sulfuric acid by wet catalysis in the presence of oxygen and water. A water-saturated clean gas is discharged to atmosphere via a stack. The sulfuric acid collected in the pores and on the surface of the catalyst is intermittently washed out by spraying water over the catalyst. Clear industrial grade sulfuric acid of 10 to 50 wt. % strength is collected in a buffer tank. The conversion of sulfur dioxide to sulfuric acid on the catalyst works according to the following reaction equation:

$$SO_2 + \tfrac{1}{2}O_2 + n\ H_2O \Rightarrow H_2SO_4 \cdot (n-1)H_2O + \text{heat}$$

The first Sulfacid® plant was started-up in 1968; now a few hundred plants are in operation worldwide.

It has been found however that the process is less efficient for a higher $SO_2$ concentration in the flue gas. It has been found that using more catalyst does not lead to higher removal of $SO_2$.

A second application for such catalysts is the removal of heavy metal removals from gas.

The so-called Kombisorbon® process (Chemosphere Vol. 37 Nos 9-12, pp 2327-2334, 1998 Elsevier Science Ltd) is designed for the removal of heavy metals, in particular mercury and cadmium, dioxins and furans, other ecotoxic organic components from waste gases.

Typical raw gas conditions:

| | |
|---|---|
| Gas temperature | up to 90° C. |
| Dust | 2-10 mg/dscm (dry standard cubic meter) |
| Mercury | up to 10 mg/dscm |
| Dioxin/Furan (TE) | up to 300 ng/dscm |

Clean gas criteria (new MACT emission standards for new FBIs (USEPA 2011, Federal Register: 40CFR Part 60): at 7% O2):

| | |
|---|---|
| Mercury | <1 µg/dscm |
| Dioxin/Furan (TE) | <0.004 ng/dscm |

The Kombisorbon® system generally uses a conditioner and a fixed-bed adsorber. The conditioner includes a coalescer, a droplet separator and a heat exchanger to condition the flue gas to reach optimal parameters before entering the adsorber.

The Kombisorbon® process allows removing ionic mercury known as $Hg^{2+}$ through adsorption as $HgCl_2$ on the activated carbon catalyst, to remove elemental mercury known as $Hg^0$ by forming with the sulfur on the carbon mercuric sulfide known as HgS and to remove dioxins and furans through absorption.

Typical applications are sewage sludge or hazardous waste incineration plants. The first commercial-scale Kombisorbon® unit, was installed in a sewage sludge incineration plant in 1994. Since that time more than 20 units have been put into operation worldwide.

It has been found however that the catalyst could still be optimized. Indeed it was found that the activated carbon catalyst does not work efficiently at high concentrations of pollutants.

BRIEF SUMMARY

The disclosure provides a catalyst which is efficient at higher levels of pollutants in the removal of $SO_2$, heavy metals and/or dioxins and furans.

More specifically, the present disclosure proposes a catalyst comprising a mixture of 95% vol. to 30% vol. of an activated carbon catalyst and from 5% vol. to 70% vol. of a filler material. Said filler material comprises plastic, alumina, metal, ceramic materials or mixture thereof.

Surprisingly, the fact that the activated carbon catalyst is mixed with a filler material allows obtaining a more complete removal of pollutants at higher initial concentration. The catalyst is thus efficient at higher levels of pollutants.

It has also been found that the catalyst composition is more easily regenerated if between 5 and 70% vol. of a filler material is used.

The activated carbon catalyst is preferably extruded and has a grain size of 0.80-130 mm. The activated carbon catalyst is preferably granulated and has a grain size: 0.30 to 4.75 mm. The activated carbon catalyst is thus not under powder form.

In an embodiment the activated carbon catalyst is preferably a mixture of granulated and extruded catalyst.

The carbon catalyst may be produced from brown and bituminous coals, fruit pits, coconut shells, lignite, peat, wood, sawdust/saw chip, petroleum coke, bone and paper mill waste (lignin), synthetic polymers like PVC, rayon, viscose, polyacrylonitrile or phenols.

The carbon catalyst may be activated by:
a physical treatment: pyrolyzed at a temperature range between 600 and 900° C. in inert atmosphere or treated in an oxidized atmosphere at a temperature around 900° C. (between 850° C. and 950° C.).

a chemical treatment: impregnation with acid, strong base or salts (e.g. sulfuric, chlorhydric or phosphoric acid, potassium or sodium hydroxide, calcium or zinc chloride)

a combination of both a physical and a chemical treatment.

The activated carbon catalyst may have a specific surface area (BET): 400 to 1800 $m^2/g$ and an acid or alkaline pH.

Preferably at least 5% vol, 7% vol, 9% vol, 11% vol, 13% vol, 15% vol, 17% vol, 19% vol, 21% vol, 23% vol, 25% vol, 27% vol, 29% vol, 31% vol., 33% vol., 35% vol., 37% vol., 39% vol., 41% vol., 43% vol., 45% vol., 47% vol., 49% vol., 51% vol., 53% vol., 55% vol., 57% vol., 59% vol., 61% vol., 63% vol., 65% vol., 67% vol., 69% vol. or at least 70% vol of filler are used in the mixture of activated carbon catalyst and a filler material.

Preferably at most 70% vol, 68% vol., 66% vol., 64% vol., 62% vol., 60% vol., 58% vol., 56% vol., 54% vol., 52% vol., 50% vol., 48% vol, 46% vol, 44% vol, 42% vol, 40% vol, 38% vol, 36% vol, 34% vol, 32% vol, 30% vol., 28% vol., 26% vol., 24% vol., 22% vol., 20% vol., 18% vol., 16% vol., 14% vol., 12% vol., 10% vol., 8% vol., 7% vol. or at most 6% vol. of filler are used in the mixture of activated carbon catalyst and a filler material.

In an embodiment, the filler material is between 10% vol. and 30% vol. of the mixture of activated carbon catalyst and a filler material.

In an embodiment, the filler material may comprise an active catalyst material (e.g. V, Fe, Zn, Si, $Al_2O_3$).

In particular, fillers made of ceramic material. Preferably they have a free volume of 50-79%.:
 i. Novalox® Saddle: 12.7-76.2 mm
 ii. Berl saddle: 4-50 mm
 iii. Cylindrical ring: 5-200 mm
 iv. Pall® ring: 25-100 mm
 v. Transitional grid lining
 vi. Cylindrical ring with 1 bar or 1 cross: 80-200 mm
 vii. Grid block: 215*145*90 mm Preferably, fillers made of metal, having in particular a free volume of 95-98% may be used:
 i. Cylindrical ring. 15-50 mm
 ii. Pall® ring: 15-90 mm
 iii. VSP®: 25-50 mm
 iv. Top-Pak®: 15 mm
 v. Novalox®-M: 15-70 mm
 vi. Twin-Pak®: 10-15 mm
 vii. Interpak®: 10-20 mm In particular, fillers made of plasticmay be used. Preferably they have a free volume of 87-97%:
 i. Novalox® saddle: 12.7-50.8 mm
 ii. Pall® ring: 15-90 mm
 iii. VSP®: 25-90 mm
 iv. Igel®: 40 mm
 v. Netball®: 45-90 mm The "free volume" of these fillers is the volume of the voids measured when a certain volume is filled/packed with the filler. The empty space/voids between the filler particles is measured by fluid displacement and expressed in percentage. The free volume will be filled (at least in part) by the active carbon catalyst.

The filler material is thus made up of distinct, individual particles that are added to the activated carbon catalyst to improve, to enhance some properties of the mixtured material. The filler material particles generally have a mean particle size (based on the average largest dimension (by number) of the particle) of more than 4 mm. Usually their mean particle size (based on the average largest dimension (by number) of the particle) is less than 200 mm.

In an embodiment, the mixture of activated carbon catalyst and a filler material contains no other solid ingredients than the activated carbon catalyst and the filler material. The total of these ingredients makes thus 100% vol. of the mixture. It goes without saying that the mixture is a heterogeneous mixture since the components have a different particles sizes, different densities etc. The identities of the components of the mixture are retained. The term "mixture" does not encompass a layered structure.

The catalyst is used preferably in a process to clean a gas containing $SO_2$ and $O_2$ e.g. a waste gas generated by chemical and metallurgical processes. Its $SO_2$ content is typically between 300 ppm and 200,000 ppm.

The gas being brought into contact with the mixture of activated carbon catalyst and a filler material is usually at a temperature between 10° C. and 150° C.

The $O_2$ content of the gas is as a rule between 2 and 21% vol.

Any heavy metals (such as Hg and Cd) are also removed from the gas during the process.

The disclosure also concerns a mixture comprising between 30% vol. and 60% vol. of an activated carbon catalyst impregnated with sulfur, between 30% vol. and 60% vol. of an activated carbon catalyst impregnated with iron and between 5% vol. and 40% vol. of a filler material, the total of these three ingredients being 100% vol. Such a mixture is especially suited to depollute fluids containing heavy metals and/or dioxins.

Surprisingly it has been found that the catalyst is more efficient for removal of heavy metals and dioxins from a fluid if a mixture of an activated carbon catalyst impregnated with sulfur, of an activated carbon catalyst impregnated with iron and of a filler material is used.

It has also been found that the catalyst composition is more easily regenerated if between 5 and 40% vol. of a filler material is used. As a demonstration example of this, a Kombisorbon® unit is regenerated periodically (2-4 times a year) on an industrial site. The drying time period after this regeneration period is reduced by more than 40% (28 instead of 48 hours) in case of a reactor bed with an activated carbon catalyst (80% vol.)/filler material (20% vol.) mixture compared to activated carbon catalyst alone.

The term heavy metal refers to any metallic chemical element that has a relatively high density and is toxic or poisonous at low concentrations. Examples of heavy metals include mercury (Hg), cadmium (Cd), arsenic (As), chromium (Cr), thallium (Tl), and lead (Pb). A toxic heavy metal is any relatively dense metal or metalloid that is noted for its potential toxicity, especially in environmental contexts. The term has particular application to cadmium, mercury, lead and arsenic, all of which appear in the World Health Organisation's list of 10 chemicals of major public concern. Other examples include manganese (Mg), cobalt (Co), nickel (Ni), copper (Cu), zinc (Zn), selenium (Se), silver (Ag) and antimony (Sb).

Surprisingly it has been found that the catalyst can be used for the removal of heavy metals from a gas—i.e. waste gas from incineration plant eliminating municipal solid waste, industrial solid wastes and sewage sludge or liquids from industrial waste water, from cement industry, from petroleum refining, from chemical manufacturing, from metal finishing, from printed circuit manufacturing, from oil and gas extraction and from hazardous waste.

According to various embodiments, the mixture comprises at least 30% vol., 31% vol., 32% vol., 33% vol., 34% vol., 35% vol., 36% vol., 37% vol., 38% vol., 39% vol., 40% vol., 41% vol., 42% vol., 43% vol., 44% vol., 45% vol., 46% vol., 47% vol., 48% vol., 49% vol., 50% vol., 51% vol., 52% vol., 53% vol., 54% vol., 55% vol., 56% vol., 57% vol., 58% vol. or 59% vol. of an activated carbon catalyst impregnated with sulfur.

According to various embodiments, the mixture comprises at most 60% vol., 59% vol., 58% vol., 57% vol., 56% vol., 55% vol., 54% vol., 53% vol., 52% vol., 51% vol., 50% vol., 49% vol., 48% vol., 47% vol., 46% vol., 45% vol., 44% vol., 43% vol., 42% vol., 41% vol., 40% vol., 39% vol., 38% vol., 37% vol., 36% vol., 35% vol., 34% vol., 33% vol., 32% vol., or 31% vol., of an activated carbon catalyst impregnated with sulfur.

In a preferred embodiment, the mixture comprises between 40% vol. and 50% vol. of activated carbon catalyst impregnated with sulfur through $H_2S$ oxidation by reaction of activated carbon at 100° C. in gas stream loaded with $H_2S$ and $O_2$ for a reaction time between 10 and 20 minutes.

Preferably, the activated carbon catalyst impregnated with sulfur comprises between 5% weight and 20% weight of sulfur before use. The active carbon catalyst can be impregnated with sulfur either by an impregnation with elemental sulfur or by $H_2S$ oxidation by oxygen. Activated carbon catalysts impregnated with sulfur are available commercially.

According to various embodiments, the mixture comprises at least 30% vol., 31% vol., 32% vol., 33% vol., 34% vol., 35% vol., 36% vol., 37% vol., 38% vol., 39% vol., 40% vol., 41% vol., 42% vol., 43% vol., 44% vol., 45% vol., 46% vol., 47% vol., 48% vol., 49% vol., 50% vol., 51% vol., 52% vol., 53% vol., 54% vol., 55% vol., 56% vol., 57% vol., 58% vol. or 59% vol. of an activated carbon catalyst impregnated with iron.

According to various embodiments, the mixture comprises at most 60% vol., 59% vol., 58% vol., 57% vol., 56% vol., 55% vol., 54% vol., 53% vol., 52% vol., 51% vol., 50% vol., 49% vol., 48% vol., 47% vol., 46% vol., 45% vol., 44% vol., 43% vol., 42% vol., 41% vol., 40% vol., 39% vol., 38% vol., 37% vol., 36% vol., 35% vol., 34% vol., 33% vol., 32% vol., or 31% vol. of an activated carbon catalyst impregnated with iron.

In a preferred embodiment, the mixture comprises between 40% vol. and 50% vol. of activated carbon catalyst impregnated with iron.

Preferably, the activated carbon catalyst impregnated with iron comprises between 10% weight and 30% weight of iron. Such activated carbon catalyst impregnated with iron are available commercially or can be manufactured by coating activated carbon with iron by impregnation methods and thermochemical reactions using i.e. 100 mM $FeCl_3$ solution, with a pH adjusted to slightly basic conditions, stirred for twenty-four hours at 70° C.

According to various embodiments, the mixture comprises at least 5% vol., 6% vol., 7% vol., 8% vol., 9% vol., 10% vol., 11% vol., 12% vol., 13% vol., 14% vol., 15% vol., 16% vol., 17% vol., 18% vol., 19% vol., 20% vol., 21% vol., 22% vol., 23% vol., 24% vol., 25% vol., 26% vol., 27% vol., 28% vol., 29% vol., 30% vol., 31% vol., 32% vol., 33% vol., 34% vol., 35% vol., 36% vol., 37% vol., 38% vol. or 39% vol. of filler material.

According to various embodiments, the mixture comprises at most 40% vol., 39% vol., 38% vol., 37% vol., 36% vol., 35% vol., 34% vol., 33% vol., 32% vol., 31% vol., 30% vol., 29% vol., 28% vol., 27% vol., 26% vol., 25% vol., 24% vol., 23% vol., 22% vol., 21% vol., 20% vol., 19% vol., 18% vol., 17% vol., 16% vol., 15% vol., 14% vol., 13% vol., 12% vol., 11% vol., 10% vol., 9% vol., 8% vol., 7% vol. or 6% vol. of filler material.

In a preferred embodiment, the filler materials are present in an amount from 5 to 15% vol.

According to various embodiments, the filler material is a shape chosen among saddle shaped, ring shaped, ball shaped, torus shaped, prism shaped or irregular shaped.

The filler is preferably chosen from fillers made of ceramic material, made of metal, fillers made of plastic, fillers made of mineral or mixtures thereof. Preferably, the filler material comprises plastic, alumina, metal, ceramic materials or mixture thereof.

According to various embodiments, the filler materials are shaped as balls, saddles, rings or tubes.

In an embodiment, the mixture of activated carbon catalyst impregnated with sulfur, activated carbon catalyst impregnated with iron and a filler material contains no other solid ingredients than the activated carbon catalysts and the filler material. The total of these three ingredients makes thus 100% vol. of the mixture.

According to various embodiments, the catalyst can be used to treat waste gas from sewage incineration plants, sludge incineration plants or hazardous waste incineration plants.

In a preferred embodiment, the gas comprises at least 50 mg/dscm, preferably at least 45 mg/dscm, more preferably at least 40 mg/dscm of heavy metals.

In a preferred embodiment, the gas comprises at least 1000 ng/dscm, preferably at least 500 ng/dscm, more preferably at least 200 ng/dscm of dioxins. The term "dioxins" as used herein refers to dioxins and dioxin-like substances, including PCBs, as defined in the Stockholm Convention on Persistent Organic Pollutants.

According to various embodiments, the catalyst can also be used to treat contaminated liquids.

Preferably, the liquid is left in contact with the catalyst composition for at least 1 h, 2 h, 3 h or 10 h.

According to various embodiments, the liquid comprises at least 50 mg/l of heavy metals, preferably at least 45 mg/l, more preferably at least 40 mg/l of heavy metals.

In a preferred embodiment, the liquid comprises at least 20 µg/l, preferably at least 2 µg/l, more preferably at least 0.02 µg/l of dioxins.

DETAILED DESCRIPTION

Further details and advantages of the disclosure can be taken from the following detailed description of a possible embodiment of the disclosure on the basis of the accompanying FIG. 1. In the drawings:

FIG. 2 is a graph showing the values measured during Test 1 of the $SO_2$ content of the waste gases at the inlet and outlet of the reactor;

FIG. 3 is a graph showing the values measured during Test 2 of the $SO_2$ content of the waste gases at the inlet and outlet of the reactor;

FIG. 4 is a graph showing the values measured during Test 3 of the $SO_2$ content of the waste gases at the inlet and outlet of the reactor;

FIG. 5 is a graph showing the values measured during Test 4 of the $SO_2$ content of the waste gases at the inlet and outlet of the reactor.

FIG. 6 is a graph showing the values measured during Test 5 of the $SO_2$ content of the waste gases at the inlet and outlet of the reactor;

FIG. 7 is a graph showing the values measured during Test 6 of the $SO_2$ content of the waste gases at the inlet and outlet of the reactor.

FIG. 8 is a graph showing the values measured during Test 7 and 8 of the $SO_2$ loading capacity of an active carbon catalyst and of a mixture of an active carbon catalyst and a filler.

FIG. 9 is a graph showing the values measured during Test 7 and 8 of the drying time of an active carbon catalyst and of a mixture of an active carbon catalyst and a filler.

FIG. 10 is a graph showing the removal efficiency of an active carbon catalyst alone and different ways of mixing an active carbon catalyst with filler in relation to Test 12a, b, c and d.

Figure 1:
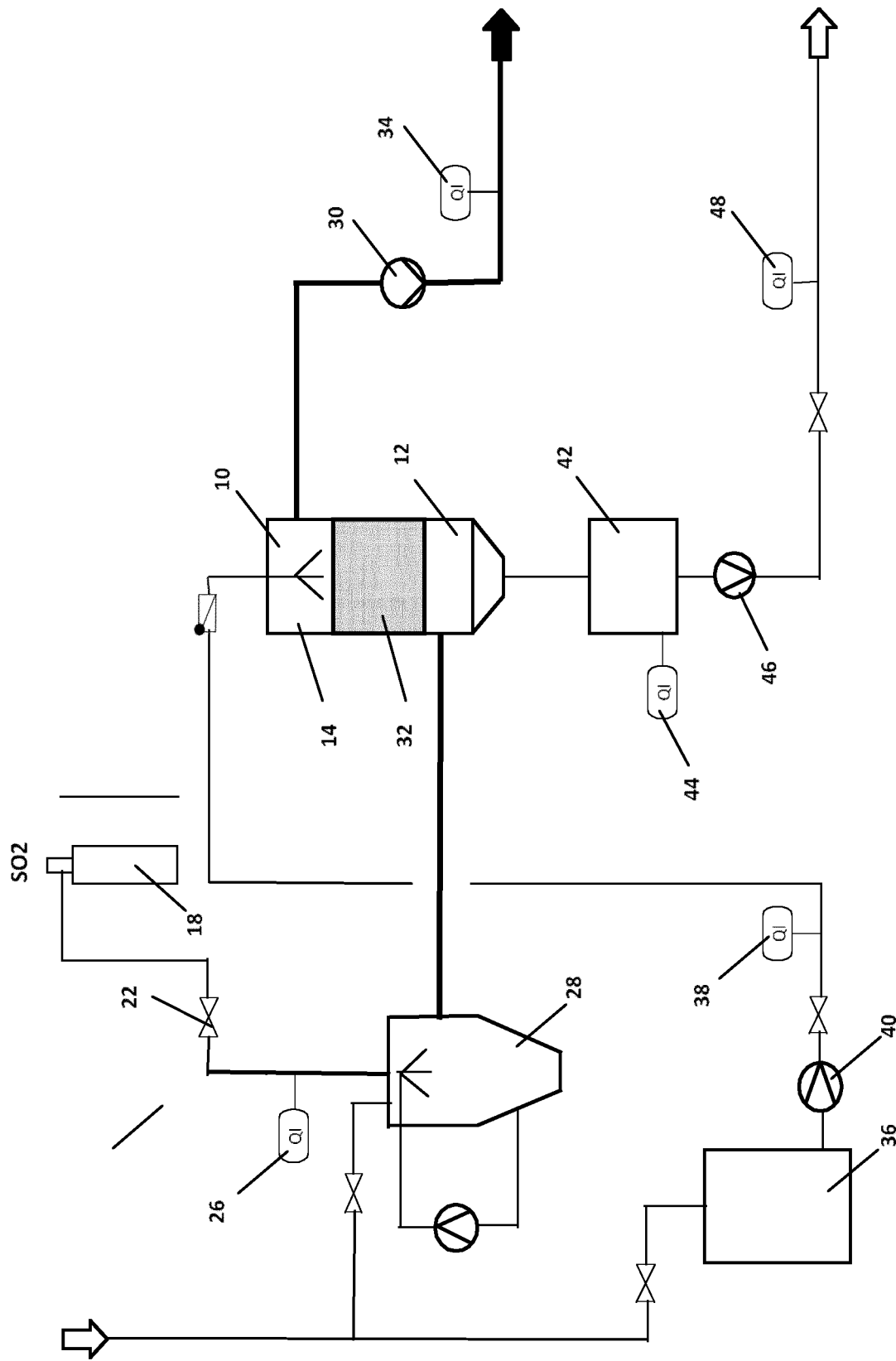
FIG. 1 is a schematic view of a plant to depollute gas containing $SO_2$ and/or dioxins.

FIG. 11 is a graph showing the removal efficiency of an active carbon catalyst mixed with different quantities of a first filler material in relation to Test 13, FIG. 12 is a graph showing the removal efficiency of an active carbon catalyst mixed with different quantities of a second filler material in relation to Test 14, FIG. 13 is a graph showing the removal efficiency of an active carbon catalyst mixed with ¼ of different sized filler materials in relation to Test 15, FIG. 14 is a graph showing the removal efficiency of different types of active carbon catalyst mixed with ¼ of filler materials in relation to Test 16,

DESCRIPTION OF PREFERRED EMBODIMENTS

The test arrangement shown in FIG. 1 in order to illustrate the disclosure comprises a test reactor 10, to the lower part 12 of which a test gas is supplied and in the upper part 14 of which water is sprayed.

For the purpose of these tests, instead of waste gas a test gas is used to simulate the waste gases. The test gas comprises ambient air which is used as is, at a temperature between 10-12° C. and to which $SO_2$ is subsequently added from a pressurized cylinder 18 via corresponding valve 22. A first measuring device 26 analyses the composition ($SO_2$ content, $O_2$ content), the temperature, the flow volume and the flow rate of the test gas.

The test gas is then cooled to saturation temperature in a quench 28 by evaporation of water. The test gas is drawn via the quench 28 into the reactor 10 by a fan 30. A coalescer, a droplet separator or a mist collector at the outlet of the quench 28 collects any droplets that might be contained in the test gas as it exits from the quench.

The test gas flows through the reactor 10 and through the activated carbon catalyst or the filling material or a combination of an activated carbon catalyst and filling material 32 arranged inside the test reactor 10. The test gas flows from the bottom to the top of the reactor 10 and is then examined once it is discharged from the test reactor 10 in a second measuring device 34 for the same parameters as in the first measuring device 26, i.e. composition ($SO_2$ content, $O_2$ content), the temperature, the flow volume and the flow rate, and is then released into the atmosphere.

The water required in the process is fed from a storage container 36 via a metering device 38, where the flow is measured, and a pump 40 into the upper part 14 of the test reactor 10, where the water flows through the activated carbon catalyst or the filling material or a combination of activated carbon catalyst and filling material 32 in counterflow to the test gas.

Alternatively however, the water required in the process can also be fed through the reactor in co-current flow with, i.e. in the same direction as, the test gas. The selection of a co-current or counterflow method depends for example on the local conditions.

The water required for the quench 28 comes directly from the water supply and is circulated within the quench.

The $SO_2$ is catalytically converted into $SO_3$ on the activated carbon catalyst, and is then converted into sulfuric acid if water is added.

The filling material is randomly mixed with the activated carbon catalyst and the mixture is located above the sieve i.e. a metallic mesh sieve with mesh inferior to the particle size of the mixture of catalyst and filler (e.g. >2 mm.

The sulfuric acid formed is rinsed off from the activated carbon catalyst by intermittent spraying with water, as a function of the volume of the catalyst and of the $SO_2/SO_3$ concentration, in counterflow to the gas.

The presence of filling material surprisingly improves the conversion efficiency during $SO_2$ catalytic reaction and/or during spraying with water due to liquid/gas interaction. The presence of the filling material seems to enhance the liquid and gas flows as well as their repartition through the catalyst bed that allows a more uniform liquid and gas coverage of each catalyst grain and thus a higher $SO_3$ to $H_2SO_4$ conversion. Indeed the regeneration of the activated carbon catalyst is quicker and more efficient leading to a shorter regeneration-cycle time.

It has been found that there is a
Good fluid distribution
Low pressure drop in the reactor
Less temperature gradient
These main parameters may explain the better performance of the system.

The filler material may optionally be impregnated as stated before.

In the test reactor described above, spraying with water was carried out 1-4 times/hour using an amount of water of 12.5-125 l/hour/m³ of mixture. The water is collected in a container 42 in the lower part 12 of the test reactor 10 together with the aqueous sulfuric acid solution produced during the process. The acid content is determined by means of a measuring device 44. The sulfuric acid solution is then pumped off by a pump 46 and the flow volume is ascertained using a further measuring device 48.

In the system described above, the sulfur dioxide of the waste gases is catalytically converted via $SO_3$ on wet catalyst particles to form sulfuric acid. The method was tested successfully under the following conditions:

Water saturation of the waste gases before entry into the reactor by quenching.
$SO_2$ content of the flue gases between 300 ppm and 6000 ppm.
Gas temperature between 10 and 12° C.
$O_2$ content approximately 20% by volume.
Water saturation and eventually cooling of the waste gases by quenching.

Tested catalysts were provided by CABOT NORIT Nederland B.V. of Postbus 105 NL-3800 AC Amersfoot and Jacobi Carbons GmbH Feldbergstrasse 21 D-60323 Frankfurt/Main under the names Norit®_RST-3, respectively JACOBI_EcoSorb® VRX-Super. These catalysts are an extruded wood/charcoal based activated carbon catalysts with a particle size of about 3 mm. The following general properties are guaranteed by the manufacturer: iodine number 900-1200 mg/g; inner surface (BET) 1000-1300 m2/g; bulk density 360-420 kg/m3; ash content 6-7% by weight; pH alkaline; moisture (packed) 5% by weight.

It must be noted that the active carbon catalysts do not contain:
a. any iodine, bromine or a compound thereof,
b. any water repellent,
c. any catalytically active metals such as Platinum, Palladium, Rhodium etc. or
d. any organic/catalytically active metal complexes based on metals such as Platinum, Palladium, Rhodium etc.

The active carbon catalyst is not hydrophobized by means of hydrophobic polymer compounds such as polytetrafluoroethylene, polyisobutylene, polyethylene, polypropylene or polytrichlorfluorethylen.

In the tests, flue gas analyzers of a German company named Testo were used. The devices were calibrated by the manufacturer. In addition, the analysis data of these flue gas analyzers was confirmed by wet-chemical measurements carried out in parallel. The results of all measurements fell within the admissible deviation tolerances.

The progression of the $SO_2$ conversion by $H_2SO_4$ on the catalyst surface corresponds to the following total formula:

$$SO_2 + \tfrac{1}{2}O_2 + nH_2O \text{(catalytically)} \rightarrow H_2SO_4 + (n-1)H_2O$$

Without wanting to be committed to a particular theory, it is assumed that:
- $O_2$ and $SO_2$ migrate toward the active centers of the catalyst where they are converted into $SO_3$.
- $SO_3$ migrates out from the active centers of the catalyst and forms $H_2SO_4$ with the aqueous covering around the catalyst core.
- $SO_2$ reacts with oxygen and water to form sulfuric acid in accordance with the reaction equation above.

The filling material mixed with activated carbon catalyst enables an optimal liquid and gas interaction with catalyst active sites.

Softened or demineralized water is used to wash out the catalyst.

The specific level of $SO_2$ saturation achieved in the pores of the catalyst in respect of the sulfuric acid formation occurs in the reactor once sufficient $SO_2$ has been converted into $SO_3$ and starts to form sulfuric acid.

Such a condition is reached after approximately 20 to 100 operating hours depending on the approach adopted (amount of $SO_2/SO_3$ fed and corresponding water spraying rate). The percentage by weight of acid produced is independent of the duration—i.e. the time of contact between the gas and the catalyst. The $SO_2$ to $H_2SO_4$ conversion is dependent on the $SO_2$ to $SO_3$ conversion efficiency and on the amount of water or aqueous solution used. For this reason, this process can produce solutions with different percentages by weight of sulfuric acids ($H_2SO_4$).

| Test 1: (Comparative Test) The tests were carried out under the following conditions: | | | |
|---|---|---|---|
| Raw gas volume flow | min. | 200 | m³/h |
| | max. | 300 | m³/h |
| SO₂ content (inlet) | min. | 2000 | ppm |
| | max. | 3000 | ppm |
| Gas temperature | min. | 10° | C. |
| | max. | 12° | C. |
| Relative Humidity of the gas | | 100 | % |
| O2 content | | >20% | by volume |

The reactor is made of inert glass fiber reinforced plastics material, has a volume of approximately 2 m³ and is filled with 1.2 m³ of an activated carbon catalyst of the Norit®_RST-3 type.

In a first phase the test system was run for approximately 50 hours with the addition of $SO_2$ from gas cylinders, and in this instance between 2,000 and 3,000 ppm of $SO_2$ were added. Overall, the reactor was charged with approximately 88 kg of $SO_2$ (approximately 73 kg of $SO_2/m^3$ of catalyst bed). In accordance with this test, the addition of water at 15 l/hour was divided into 2 portions/hour (10.2 l/hour/m³ of catalyst bed). The $SO_2$ content of the waste gases was measured at the inlet and at the outlet of the reactor, as illustrated in FIG. 1. The measurements were taken every 30 seconds and are shown in graphs in FIG. 2. The first measurements shown in this case were taken after saturation of the catalyst, i.e. 50 hours after start-up of the reactor. The $SO_2$ outlet concentration fluctuated repeatedly between 600 ppm and 900 ppm, with a $SO_2$ removal efficiency of 66%. The test was carried out continuously over approximately 9 hours.

| Test 2: The tests were carried out under the following conditions: | | | |
|---|---|---|---|
| Raw gas volume flow | min. | 200 | m³/h |
| | max. | 300 | m³/h |
| SO₂ content (inlet) | min. | 2000 | ppm |
| | max. | 3000 | ppm |
| Waste gas temperature | min. | 10° | C. |
| | max. | 12° | C. |
| % of relative humidity | | 100 | % |
| O₂ content | | >20% | by volume |

The reactor is made of inert glass fiber reinforced plastics material, has a volume of approximately 2 m3 and is filled with 1.2 m3 of an activated carbon catalyst of the JACOBI_EcoSorb® VRX-Super type.

Contrary to the test 1, the reactor was charged immediately when running with the addition of $SO_2$ from gas cylinders, and in this instance between 2,000 and 3,000 ppm of $SO_2$ were added. In accordance with this test, the addition of water at 15 l/hour was divided into 2 portions/hour (10.2 l/hour/m³ of catalyst bed). The $SO_2$ content of the waste gases was measured at the inlet and at the outlet of the reactor, as illustrated in FIG. 1. The measurements were taken every 30 seconds and are shown in graphs in FIG. 3. The first measurements shown in this case were taken directly after start-up of the reactor. The $SO_2$ outlet concentration fluctuated repeatedly between 600 ppm and 900 ppm with a $SO_2$ removal efficiency of 64%. The test was carried out continuously over approximately 6 hours.

| Test 3: The tests were carried out under the following conditions: | | | |
|---|---|---|---|
| Raw gas volume flow | min. | 200 | m3/h |
| | max. | 300 | m3/h |
| SO₂ content (inlet) | min. | 2000 | ppm |
| | max. | 3000 | ppm |
| Waste gas temperature | min. | 10° | C. |
| | max. | 12° | C. |
| % of relative humidity | | 100 | % |
| O2 content | | >20% | by volume |

The reactor is made of inert glass fiber reinforced plastics material, has a volume of approximately 2 m³ and is filled with 1.2 m³ of an activated carbon catalyst of the Norit®_RST-3 type modified by CPPE by mixing with 0.27 m³ of a ceramic filling material (Novalox® saddle Acidur-Special-Stoneware supplied by Vereinigte Füllkörper-Fabriken).

Like the test 2, the reactor was charged immediately when running with the addition of $SO_2$ from gas cylinders, and in this instance between 2,000 and 3,000 ppm of $SO_2$ were added. In accordance with this test, the addition of water at 15 l/hour was divided into 2 portions/hour (10.2 l/hour/m³ of catalyst bed). The $SO_2$ content of the waste gases was measured at the inlet and at the outlet of the reactor, as illustrated in FIG. 1. The measurements were taken every 30 seconds and are shown in graphs in FIG. 4. The first measurements shown in this case were taken directly after start-up of the reactor. The $SO_2$ outlet concentration fluctuated repeatedly between 15 ppm and 95 ppm with a $SO_2$ removal efficiency of 96%. The test was carried out continuously over approximately 7 hours.

| Test 4: The tests were carried out under the following conditions: | | | |
| --- | --- | --- | --- |
| Raw gas volume flow | min. | 200 | m³/h |
| | max. | 300 | m³/h |
| $SO_2$ content (inlet) | min. | 2000 | ppm |
| | max. | 3000 | ppm |
| Waste gas temperature | min. | 10° | C. |
| | max. | 12° | C. |
| % of relative humidity | | 100 | % |
| $O_2$ content | >20% | | by volume |

The reactor is made of inert glass fiber reinforced plastics material, has a volume of approximately 2 m³ and is filled with 1.2 m³ of an activated carbon catalyst of the JACOBI_EcoSorb® VRX-Super type modified by CPPE by mixing with 0.27 m3 of a ceramic filling material (Novalox® saddle Acidur-Special-Stoneware supplied by Vereinigte Füllkörper-Fabriken).

Like the test 2, the reactor was charged immediately when running with the addition of $SO_2$ from gas cylinders, and in this instance between 2,000 and 3,000 ppm of $SO_2$ were added. In accordance with this test, the addition of water at 15 l/hour was divided into 2 portions/hour (10.2 l/hour/m³ of catalyst bed). The $SO_2$ content of the waste gases was measured at the inlet and at the outlet of the reactor, as illustrated in FIG. 1. The measurements were taken every 30 seconds and are shown in graphs in FIG. 5. The first measurements shown in this case were taken directly after start-up of the reactor. The $SO_2$ outlet concentration fluctuated repeatedly between 15 ppm and 92 ppm with a $SO_2$ removal efficiency of 97%. The test was carried out continuously over approximately 7 hours.

| Test 5: The tests were carried out under the following conditions: | | | |
| --- | --- | --- | --- |
| Raw gas volume flow | min. | 200 | m³/h |
| | max. | 300 | m³/h |
| $SO_2$ content (inlet) | min. | 2000 | ppm |
| | max. | 3000 | ppm |
| Waste gas temperature | min. | 10° | C. |
| | max. | 12° | C. |
| % of relative humidity | | 100 | % |
| O2 content | >20% | | by volume |

The reactor is made of inert glass fiber reinforced plastics material, has a volume of approximately 2 m³ and is filled with 1.2 m³ of an activated carbon catalyst of the Norit®_RST-3 type modified by CPPE by mixing with 0.27 m³ of a ceramic filling material (Novalox® saddle Acidur-Special-Stoneware supplied by Vereinigte Füllkörper-Fabriken).

Like the test 2, the reactor was charged immediately when running with the addition of $SO_2$ from gas cylinders, and in this instance between 2,000 and 3,000 ppm of $SO_2$ were added. In accordance with this test, the addition of water at 71 l/hour was divided into 2 portions/hour (48.3 l/hour/m³ of catalyst bed). The $SO_2$ content of the waste gases was measured at the inlet and at the outlet of the reactor, as illustrated in FIG. 1. The measurements were taken every 30 seconds and are shown in graphs in FIG. 6. The first measurements shown in this case were taken directly after start-up of the reactor. The $SO_2$ outlet concentration fluctuated repeatedly between 9 ppm and 43 ppm, with a $SO_2$ removal efficiency of 98%. The test was carried out continuously over approximately 4 hours.

| Test 6: The tests were carried out under the following conditions: | | | |
| --- | --- | --- | --- |
| Raw gas volume flow | min. | 200 | m3/h |
| | max. | 300 | m3/h |
| $SO_2$ content (inlet) | min. | 2000 | ppm |
| | max. | 3000 | ppm |
| Waste gas temperature | min. | 10° | C. |
| | max. | 12° | C. |
| % of relative humidity | | 100 | % |
| O2 content | >20% | | by volume |

The reactor is made of inert glass fiber reinforced plastics material, has a volume of approximately 2 m³ and is filled with 1.2 m³ of an activated carbon catalyst of the Norit®_RST-3 type modified by CPPE by mixing with 0.27 m³ of a plastic filling material (Pall®-V-ring supplied by Vereinigte Füllkörper-Fabriken).

Like the test 2, the reactor was charged immediately when running with the addition of $SO_2$ from gas cylinders, and in this instance between 2,000 and 3,000 ppm of $SO_2$ were added. In accordance with this test, the addition of water at 15 l/hour was divided into 2 portions/hour (10.2 l/hour/m³ of catalyst bed). The $SO_2$ content of the waste gases was measured at the inlet and at the outlet of the reactor, as illustrated in FIG. 1. The measurements were taken every hour and are shown in graphs in FIG. 5. The first measurements shown in this case were taken directly after start-up of the reactor. The $SO_2$ concentration fluctuated repeatedly between 90 ppm and 160 ppm, with a $SO_2$ removal efficiency of 95%. The test was carried out continuously over approximately 30 hours.

| Test 7: The tests were carried out under the following conditions: | | | |
| --- | --- | --- | --- |
| Raw gas volume flow | min. | 200 | m³/h |
| | max. | 300 | m³/h |
| $SO_2$ content (inlet) | min. | 18000 | ppm |
| | max. | 22000 | ppm |
| Waste gas temperature | min. | 10° | C. |
| | max. | 12° | C. |
| % of relative humidity | | <10 | % |
| $O_2$ content | >18% | | by volume |

The reactor is made of inert glass fiber reinforced plastics material, has a volume of approximately 2 m³ and is filled with 1.2 m³ of an activated carbon catalyst of the Norit®_RST-3 type.

The quench was switched off during this test and dried activated carbon catalyst is used.

Like the test 2, the reactor was charged immediately when running with the addition of $SO_2$ from gas cylinders, and in this instance between 18,000 and 22,000 ppm of $SO_2$ were added without addition of water during the $SO_2$-loading phase. The $SO_2$ content of the waste gases was measured at the inlet and at the outlet of the reactor, as illustrated in FIG. 1. The measurements were taken each minute. The $SO_2$ inlet concentration fluctuated repeatedly between 18,000 ppm and 22,000 ppm, with a $SO_2$ removal efficiency of more than 99%. The test was carried out over approximately 106 minutes until $SO_2$ outlet was higher than 100 ppm. The $SO_2$-loading efficiency was 23 kg of $SO_2$ per cubic meter of activated carbon catalyst. After this $SO_2$-loading step, the activated carbon catalyst was washed continuously for two hours through addition of water at 50 l/hour. In a next step, ambient air, heated at 80° C., is pulled through the catalytic bed and the activated carbon catalyst is dried after a time period of 74 hours.

| Test 8: The tests were carried out under the following conditions: | | | |
|---|---|---|---|
| Raw gas volume flow | min. | 200 | m³/h |
|  | max. | 300 | m³/h |
| $SO_2$ content (inlet) | min. | 18000 | ppm |
|  | max. | 22000 | ppm |
| Waste gas temperature | min. | 10° | C. |
|  | max. | 12° | C. |
| % of relative humidity |  | <10 | % |
| $O_2$ content | >18% | by volume | |

The reactor is made of inert glass fiber reinforced plastics material, has a volume of approximately 2 m³ and is filled with 1.2 m³ of an activated carbon catalyst of the Norit®_RST-3 type modified by CPPE by mixing with 0.27 m³ of a ceramic filling material (Novalox® saddle Acidur-Special-Stoneware supplied by Vereinigte Füllkörper-Fabriken).

The quench was switched off during this test and dried activated carbon catalyst is used.

Like the test 2, the reactor was charged immediately when running with the addition of $SO_2$ from gas cylinders, and in this instance between 18,000 and 22,000 ppm of $SO_2$ were added without addition of water during the $SO_2$-loading phase. The $SO_2$ content of the waste gases was measured at the inlet and at the outlet of the reactor, as illustrated in FIG. 1. The measurements were taken each minute. The $SO_2$ inlet concentration fluctuated repeatedly between 18,000 ppm and 22,000 ppm, with a $SO_2$ removal efficiency of more than 99%. The test was carried out over approximately 117 minutes until $SO_2$ outlet was higher than 100 ppm. The $SO_2$-loading efficiency was 26 kg of $SO_2$ per cubic meter of activated carbon catalyst. After this $SO_2$-loading step, the activated carbon catalyst was washed continuously for two hours through addition of water at 50 l/hour. In a next step, ambient air, heated at 80° C., is pulled through the catalytic bed and the activated carbon catalyst is dried after a time period of 63 hours.

All the above tests have been carried out with 1.2 m³ of catalyst (activated carbon). In the tests carried out with addition of filler (whatever its shape): 0.27 m³ of filler were added to the initial 1.2 m³ of catalyst.

Vol % of the filler=0.27/(0.27+1.2)*100=18.36% vol.

A positive effect of the filler can be measured between 5% vol filler and 50% filler, the remaining being activated carbon catalyst.

The surprising effect is that the removal of $SO_2$ is more efficient when the catalyst is mixed with fillers than the catalyst alone since more $SO_2$ is converted with the same amount of catalyst as shown in FIG. 10.

In addition in case of dry process conditions, the $SO_2$-loading capacity of activated carbon catalyst is higher and the regeneration cycle is shorter in case the activated carbon catalyst is mixed with fillers as shown in FIG. 8 and in FIG. 9.

In the tests conducted it was found that ceramic filler material having a saddle shape seem to be the most efficient. Saddle shape means in the context of the present disclosure: shaped in the form of a horse's saddle, a shape that is bent down at the sides so as to give the upper part a rounded form, respectively an object having the form of an anticlinal fold.

Test 9—Removal of Heavy Metals and Dioxins from Gas—Plant Scale

Emission sampling during two days was performed at the outlet of the Kombisorbon® process reactor, filled with a specific mixture: 45% of activated carbon catalyst impregnated with sulfur supplied from Jacobi Carbons, 45% of activated carbon catalyst impregnated with iron supplied from Watch-Water, and 10% of a plastic filler material.

The removal rate of cadmium was 99.9%, for mercury more than 99.9% and more than 99.9% removal rate for dioxins. The initial levels were 5 mg/dscm for cadmium, 1 mg/dscm for mercury and 350 ng/dscm for dioxins.

The presence of activated carbon catalyst mixture and filler material allowed a better gas flow distribution and subsequently the cleaning of a higher concentrated inlet gas due to an increased removal rate of contaminants.

The presence of filler allowed a more efficient washing of the activated carbon catalyst with sulfates removal coming from the reaction between SOx and NOx with water vapors from inlet flue gas.

The presence of filler allowed a quicker drying step after regeneration with water flow.

Test 9-b Comparative Example—Removal of Heavy Metals and Dioxins from Gas—Plant Scale Emission sampling during two days was performed at the outlet of the Kombisorbon® process reactor, filled with a 100% of activated carbon catalyst impregnated with sulfur supplied from Jacobi Carbons.

The removal rate of cadmium was 99%, for mercury more than 99% and more than 99% removal rate for dioxins. The initial levels were 5 mg/dscm for cadmium, 1 mg/dscm for mercury and 350 ng/dscm for dioxins Test 10—Removal from Liquid—Laboratory Scale—Single Pass 500 cm³ of a mixture: 30% of activated carbon catalyst impregnated with sulfur supplied from Jacobi Carbons, 30% of activated carbon catalyst impregnated with iron supplied from Watch-Water, 40% of a plastic filler material was used during this test.

The level of heavy metals in a phosphoric acid solution was reduced significantly. 20% removal rate for cadmium and mercury and 35% removal rate for arsenic.

Test 11—Removal of Heavy Metals from Liquids—Laboratory Scale—Single Pass 500 cm³ of a mixture of 45% of activated carbon catalyst impregnated with sulfur, 45% of activated carbon catalyst impregnated with iron supplied from Watch-Water, and 10% of a plastic filler material was used during this test.

The level of heavy metals in a phosphoric acid solution was reduced significantly. 75% removal for cadmium and mercury and 65% removal for arsenic. The initial concentrations were 39 ppm for cadmium, 0.1 ppm for mercury and 23 ppm for arsenic.

The presence of filler material allowed less clogging from silica coming from the phosphoric acid media inside the activated carbon catalyst bed.

The presence of filler material allowed a more efficient washing of the activated carbon catalyst with easier silica removal.

Test 11-b—Comparative Example—Removal of Heavy Metals from Liquids—Laboratory Scale—Single Pass 500 cm$^3$ of 100% of activated carbon catalyst impregnated with sulfur supplied from Jacobi Carbons was used during this test.

The level of heavy metals in a phosphoric acid solution (As: 23 ppm, Hg: 0.1 ppm and Cd: 39 ppm) was reduced. 20% removal rate for mercury and 35% removal rate for arsenic Test 11-c—Comparative Example—Removal of Heavy Metals from Liquids—Laboratory Scale—Single Pass 500 cm$^3$ of 100% of activated carbon catalyst impregnated with iron supplied from Watch-Water was used during this test.

The level of heavy metals in a phosphoric acid solution (As: 23 ppm, Hg: 0.1 ppm and Cd: 39 ppm) was reduced. 50% removal rate for cadmium and mercury and 15% removal rate for arsenic The activated carbon catalyst used in the tests above had a specific high catalytic surface area (BET at least 700 m$^2$/g) with impregnation (like Br, Cu, Fe, S, OH . . . ).

The activated carbon catalyst was mixed with various types of filler materials of different shapes (cylinder, balls, "Sattelkörper", . . . ) and different material (plastic, alumina, ceramic, . . . ) in various ratios (1/5; 1/3; 1/10; . . . ). Different suppliers of activated carbon catalysts for companies like Jacobi, Cabot Carbon, Chemviron, Desotec, Carbotech and ATEC were tested.

Test 12—FIG. 10: Effect of Bed Design

In these tests different types of mixing and bed designs were tested and compared to each other in a reactor as depicted on FIG. 1.

The conditions were as follows: Test 12a
Gas flow: 200-300 m3/h
Gas temperature: starting from 10° C.
Gas flow inlet: 2000-3000 ppm
Activated carbon catalyst: 1.2 m$^3$ of extruded activated carbon catalyst with particle size 2-4 mm
Filler material: 0.27 m$^3$ of 38.1 mm wide ceramic saddle filling material
Mixing method: random mixture (called "COPE mixing" in the FIG. 10): most efficient with 90-100% SO$_2$ removal efficiency as shown on FIG. 10—left hand side
Comparative Example Test 12b—FIG. 10
The conditions were as follows:
Gas flow: 200-300 m$^3$/h
Gas temperature: starting from 10° C.
Gas flow inlet: 2000-3000 ppm
Single activated carbon catalyst bed: 55-65% SO$_2$ removal efficiency as shown on FIG. 10—second from the left.
Comparative Example Test 12c—FIG. 10
The conditions were as follows:
Gas flow: 200-300 m$^3$/h
Gas temperature: starting from 10° C.
Gas flow inlet: 2000-3000 ppm
Activated carbon catalyst: 1.2 m$^3$ of extruded activated carbon catalyst with particle size 2-4 mm
Filler material: 0.27 m$^3$ of 38.1 mm wide ceramic saddle filling material
Multilayered design: Two activated carbon catalyst beds (0.5 m$^3$ and 0.7 m$^3$ respectively) separated by a layer of 0.27 m$^3$ of filling material: less efficient with 50-65% SO$_2$ removal efficiency as shown on FIG. 10—third from the left.
Comparative Example Test 12d—FIG. 10
The conditions were as follows:
Gas flow: 200-300 m$^3$/h
Gas temperature: starting from 10° C.
Gas flow inlet: 2000-3000 ppm
Activated carbon catalyst: 1.2 m$^3$ of extruded activated carbon catalyst with particle size 2-4 mm
Filler material: 0.27 m$^3$ of 38.1 mm wide ceramic saddle filling material
Multilayered design: activated carbon catalyst/filler material layers (0.3 m$^3$ and 0.054 m$^3$ respectively) was much less efficient with 70-80% SO$_2$ removal efficiency as shown on FIG. 10—right hand side
Test 13—FIG. 11 Effect of Filler Material/Activated Carbon Volume Ratio
The conditions were as follows:
Gas flow: 200-300 m3/h
Gas temperature: starting from 10° C.
Gas flow inlet: 2000-3000 ppm
Activated carbon catalyst: extruded activated carbon with particle size 2-4 mm
Filler material: 38.1 mm wide ceramic saddle filling material
Mixing method: random mixture with different ratio in volume (Filler material/extruded activated carbon catalyst):
1/20: 5 vol % filler material and 95 vol % activated carbon catalyst
1/10: 9 vol % filler material and 91 vol % activated carbon catalyst
1/5: 17 vol % filler material and 83 vol % activated carbon catalyst
1/4: 20 vol % filler material and 80 vol % activated carbon catalyst
1/3: 25 vol % filler material and 75 vol % activated carbon catalyst
This test shows the highest efficiency with 99% SO$_2$ removal when operating with 20 vol % filler material and 80 vol % activated carbon catalyst (ratio 1/4) as shown on FIG. 11.
Comparative Test 14—FIG. 12: Effect of Filler Material/Activated Carbon Volume Ratio
The conditions were as follows:
Gas flow: 200-300 m3/h
Gas temperature: starting from 10° C.
Gas flow inlet: 2000-3000 ppm
Activated carbon catalyst: extruded activated carbon with particle size 2-4 mm
Filler material: 50 mm wide plastic pall ring filling material
Mixing method: random mixture with different ratio in volume (Filler material/extruded activated carbon catalyst):
1/20: 5 vol % filler material and 95 vol % activated carbon catalyst
1/10: 9 vol % filler material and 91 vol % activated carbon catalyst
1/5: 17 vol % filler material and 83 vol % activated carbon catalyst
1/4: 20 vol % filler material and 80 vol % activated carbon catalyst
1/3: 25 vol % filler material and 75 vol % activated carbon catalyst Highest efficiency with 82% $SO_2$ removal efficiency when operating with 20 vol % filler material and 80 vol % activated carbon (ratio 1/4) as shown on FIG. 12.

Test 15—FIG. 13: Effect of Filler Size
The conditions were as follows:
Gas flow: 200-300 m3/h
Gas temperature: starting from 10° C.
Gas flow inlet: 2000-3000 ppm
Activated carbon catalyst: extruded activated carbon catalyst with particle size 2-4 mm
Filler material: saddle filling material with different size from 12.7 (normalized size 1) to 76.2 mm (normalized size 6)
Mixing method: random mixture with 20 vol % filler material and 80 vol % activated carbon catalyst (ratio 1/4)
Higher efficiency with 88-99% $SO_2$ removal when operating with between 38.1 mm (normalized size 3) and 63.5 mm (normalized size 5) saddle filling material as shown on FIG. 13

Test 16—FIG. 14: Effect of Filler Particle Size
The conditions were as follows:
Gas flow: 200-300 m3/h
Gas temperature: starting from 10° C.
Gas flow inlet: 2000-3000 ppm
Activated carbon catalyst: bead, extruded or granulated activated carbon catalyst
Filler material: 38.1 mm wide ceramic saddle filling material
Mixing method: random mixture with 20 vol % filler material and 80 vol % activated carbon catalyst (ratio 1/4)
Higher efficiency with 99% $SO_2$ removal when operating with extruded activated carbon catalyst as shown on FIG. 14.

Although the present disclosure has been described in considerable detail with reference to certain preferred versions thereof, other versions are possible. Therefore, the spirit and scope of the appended claims should not be limited to the description of the preferred versions contained herein. All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar.

The invention claimed is:

1. A catalyst, comprising:
a heterogeneous, random mixture of 95% vol. to 30% vol. of an activated carbon catalyst, based on a total volume of the mixture, and from 5% vol. to 70% vol. of a filler material made of distinct, individual particles that are added to the activated carbon catalyst, based on a total volume of the mixture;
wherein said filler material is ceramic; and
wherein the mixture contains no other solid ingredients than the activated carbon catalyst and the filler material.

2. The catalyst as claimed in claim 1, wherein the filler material comprises a free volume of 87% vol to 97% vol, based on a total volume of the filler material.

3. The catalyst as claimed in claim 1, wherein the filler material is present in an amount from 5% vol. to 56% vol., based on a total volume of the mixture.

4. The catalyst as claimed in claim 1, configured for the removal of $SO_2$ from waste gas.

5. The catalyst according to claim 1, configured for the removal of heavy metals and dioxins from waste gas or liquids.

6. The catalyst as claimed in claim 1, wherein the mixture comprises 95% vol. to 46% vol. of the activated carbon catalyst, based on a total volume of the mixture, and from 5% vol. to 54% vol. of the filler material, based on a total volume of the mixture.

7. The catalyst as claimed in claim 1, wherein the filler material has a shape comprising ring shaped, ball shaped, torus shaped or prism shaped.

8. The catalyst as claimed in claim 1, wherein the filler material has a shape comprising ring shaped, torus shaped or prism shaped.

9. A catalyst, comprising:
a mixture of
between 30% vol. and 60% vol. of an activated carbon catalyst impregnated with sulfur, based on a total volume of the mixture,
between 30% vol. and 60% vol. of an activated carbon catalyst impregnated with iron, based on a total volume of the mixture, and
between 5% vol. and 40% vol. of a filler material, based on a total volume of the mixture,
wherein said filler material comprises plastic, alumina, metal, ceramic materials or mixture thereof, and
wherein the mixture contains no other solid ingredients than the activated carbon catalyst and the filler material.

10. The catalyst as claimed in claim 9, wherein the mixture comprises between 40% vol. and 50% vol. of the activated carbon catalyst impregnated with sulfur, based on a total volume of the mixture.

11. The catalyst as claimed in claim 9, wherein the activated carbon catalyst impregnated with sulfur comprises between 5% weight and 20% weight of sulfur, based on a total weight of the activated carbon catalyst impregnated with sulfur.

12. The catalyst as claimed in claim 9, wherein the mixture comprises between 40% vol. and 50% vol. of the activated carbon catalyst impregnated with iron, based on a total volume of the mixture.

13. The catalyst as claimed in claim 9, wherein the activated carbon catalyst impregnated with iron comprises between 10% weight and 30% weight of iron, based on a total weight of the activated carbon catalyst impregnated with iron.

14. The catalyst as claimed in claim 9, wherein
the mixture is a heterogeneous, random mixture; and
the filler material is made of distinct, individual particles that are added to the activated carbon catalyst.

15. The catalyst as claimed in claim 9, wherein the filler material has a shape comprising saddle shaped, ring shaped, ball shaped, torus shaped or prism shaped.

16. A catalyst, comprising:
a heterogeneous, random mixture of 95% vol. to 52% vol. of an activated carbon catalyst and from 5% vol. to 48% vol. of a plastic filler material made of distinct, individual particles that are added to the activated carbon catalyst, based on a total volume of the mixture;
wherein the mixture contains no other solid ingredients than the activated carbon catalyst and the plastic filler material, and.

17. The catalyst as claimed in claim 16, wherein the plastic filler material has a shape comprising ring shaped, ball shaped, torus shaped or prism shaped.

* * * * *

UNITED STATES PATENT AND TRADEMARK OFFICE
CERTIFICATE OF CORRECTION

| | | |
|---|---|---|
| PATENT NO. | : 11,369,922 B2 | Page 1 of 1 |
| APPLICATION NO. | : 16/091096 | |
| DATED | : June 28, 2022 | |
| INVENTOR(S) | : Alain Strickroth | |

It is certified that error appears in the above-identified patent and that said Letters Patent is hereby corrected as shown below:

On the Title Page

Item (87) please delete:
"(87) PCT Pub. No.: WO2017/177459"
And replace with:
-- (87) PCT Pub. No.: WO2017/174592 --

Signed and Sealed this
Twenty-third Day of August, 2022

Katherine Kelly Vidal
*Director of the United States Patent and Trademark Office*